US005432893A

United States Patent [19]

Blasubramanian et al.

[11] Patent Number: 5,432,893

[45] Date of Patent: Jul. 11, 1995

[54] SEQUENTIAL SCALAR QUANTIZATION OF DIGITAL COLOR IMAGE USING MEAN SQUARED ERROR-MINIMIZING QUANTIZER DENSITY FUNCTION

[75] Inventors: Thyagarajan Blasubramanian, Rochester, N.Y.; Charles A. Bouman; Jan P. Allebach, both of West Lafayette, Ind.; Bernd W. Kolpatzik, Lafayette, Ind.

[73] Assignee: Purdue Research Foundation, West Lafayette, Ind.

[21] Appl. No.: 58,930

[22] Filed: May 7, 1993

Related U.S. Application Data

[63] Continuation-in-part of Ser. No. 833,529, Feb. 11, 1992.

[51] Int. Cl.[6] .............................................. G06F 15/00

[52] U.S. Cl. .............................................. 395/131

[58] Field of Search ........................ 395/131, 155, 161; 358/75, 80; 345/150, 152, 153, 154, 155

[56] References Cited

U.S. PATENT DOCUMENTS

| | | | |
|---|---|---|---|
| 5,047,842 | 9/1991 | Bouman et al. | 358/75 |
| 5,315,694 | 5/1994 | Kasano | 395/131 |

OTHER PUBLICATIONS

P. Heckbert, "Color Image Quantization for Frame Buffer Display", *Computer Graphics,* vol. 16, No. 3, pp. 297–307, Jul. 1982.

G. Braudaway, "A Procedure for Optimum Choice of a Small Number of Colors from a Large Color Palette for Color Imaging"; *Electronic Imaging '87,* San Francisco, Calif., 1987.

R S. Gentile, J. P. Allebach and E. Walowit, "Quantization of Color Images Based on Uniform Color Spaces", *Journal of Imaging Technology,* vol. 16, No. 1, pp. 12–21, Feb. 1990.

Y. Linde, A. Buzo, and R. M. Gray, "An Algorithm for Vector Quantizer Design", *IEEE Trans. Commun.,* vol. COM–28, pp. 84–95, Jan. 1980.

Sudhir S. Dixit, "Quantization of Color Images for Display/Printing on Limited Color Output Devices,", *Comput. & Graphics,* vol. 15, No. 4, pp. 561–567, 1991.

R. Balasubramanian and J. P. Allebach, "A New Approach to Palette Selection for Color Images", *Journal of Imaging Technology,* vol. 17, No. 6, pp. 284–290, Dec. 1991.*

W. H. Equitz, "A New Vector Quantization Clustering Algorithm", *IEEE Trans. Acoust., Speech, Signal Processing,* vol. 37, No. 10, pp. 1568–1575, Oct. 1989.*

S. J. Wan, P. Prusinkiewicz, and S. K. M. Wong, "Variance–Based Color Image Quantization for Frame Buffer Display", *Color Research and Applications,* vol. 15, No. 1, pp. 52–58, Feb. 1990.*

(List continued on next page.)

*Primary Examiner*—Phu K. Nguyen

*Attorney, Agent, or Firm*—Raymond L. Owens

[57] ABSTRACT

A digital color image quantization mechanism employs sequential product code vector quantization, to sequentially extract chrominance and luminance values from the vectors and quantizes chrominance and luminance features in accordance with an asymptotically optimal quantizer density function of the color space histogram along respective chrominance and luminance axes into a plurality of luminance-chrominance sub-regions or color space cells, such that each partitioned color cell is associated with a color of the output palette through which the color composition of a reproduced color image is defined. A map of chrominance and luminance output codes is generated for the respective pixels of the output color image in accordance with the axial splitting or quantization of the chrominance and luminance components of the histogram. The resulting map of chrominance and luminance output codes of the output digital color image is then transformed into sets of RGB output color codes for application to respective RGB digital-to-analog converters that drive a color image reproduction device.

72 Claims, 14 Drawing Sheets

OTHER PUBLICATIONS

M. T. Orchard and C. A. Bouman, "Color Quantization of Images", *IEEE Trans. Signal Processing,* vol. 39, No. 12, pp. 2677–2690, Dec. 1991.*

T. D. Lookabaugh and R. M. Gray, "High-Resolution Quantization Theory and the Vector Quantizer Advantage", *IEEE Trans. Inform. Thy.,* vol. 35, No. 5, pp. 1020–1033, Sep. 1989.*

R. Balasubramanian, C. A. Bouman and J. P. Allebach, "New Results in Color Image Quantization", *Proceedings of the 1992 SPIE/SPSE Symposium on Electronic Imaging–Science and Technology,* San Jose, Calif., Feb. 10–13, 1992.*

A. Gersho, R. M. Gray, *Vector Quantization and Signal Compression,* Kluwer Academic Publshers, 1991, pp. 407–485.

James M. Kasson and Wil Plouffe, "An Analysis of Selected Computer Interchange Color Spaces", submitted to *Computer Graphics.,** IBM Corporation Research, pp. 1–24 (1991).

N. M. Nasrabadi and R. A. King, "Image Coding Using Vector Quantization: A Review", *IEEE Trans. Commun.* vol. COM-36, pp. 957–971, Aug. 1988.*

A. Gersho, "Asymptotically Optimal Block Quantization", *IEEE Trans. Inform. Thy.,* vol. IT–25, pp. 373–380, Jul., 1979.*

S. Na and D. L. Neuhoff, "Bennett's Integral for Vector Quantizers, and Applications", *1990 IEEE Int'l Symposium on Information Theory,* Jan. 1990.* pp. 1–21.

| Y \ X | 0 | 1 | 2 | 3 | 4 | 5 | 6 | 7 |
|---|---|---|---|---|---|---|---|---|
| 7 | 1 | 2 | 4 | 6 | 10 | 8 | 10 | 10 |
| 6 | 1 | 2 | 4 | 6 | 10 | 13 | 10 | 10 |
| 5 | 1 | 2 | 4 | 6 | 10 | 13 | 13 | 12 |
| 4 | 1 | 2 | 4 | 6 | 10 | 13 | 14 | 14 |
| 3 | 1 | 2 | 6 | 6 | 8 | 13 | 12 | 12 |
| 2 | 1 | 4 | 6 | 8 | 10 | 13 | 14 | 12 |
| 1 | 2 | 4 | 6 | 8 | 8 | 13 | 13 | 14 |
| 0 | 2 | 4 | 6 | 8 | 10 | 13 | 13 | 14 |

| Y \ X | 0 | 1 | 2 | 3 | 4 | 5 | 6 | 7 |
|---|---|---|---|---|---|---|---|---|
| 7 | 8 | 7 | 6 | 5 | 3 | 2 | 10 | 6 |
| 6 | 7 | 6 | 5 | 5 | 12 | 1 | 9 | 7 |
| 5 | 7 | 6 | 5 | 4 | 10 | 6 | 9 | 4 |
| 4 | 6 | 5 | 4 | 3 | 1 | 3 | 14 | 1 |
| 3 | 5 | 4 | 3 | 2 | 5 | 8 | 3 | 7 |
| 2 | 4 | 3 | 2 | 1 | 13 | 6 | 0 | 2 |
| 1 | 3 | 2 | 1 | 0 | 4 | 11 | 11 | 6 |
| 0 | 2 | 1 | 0 | 0 | 12 | 9 | 0 | 7 |

FIG. 11

| Y \ $C_r$ | 0 1 | 2 3 | 4 5 | 6 7 | 8 9 | 10 11 | 12 13 | 14 15 |
|---|---|---|---|---|---|---|---|---|
| 15 | 0 | 0 | 0 | 0 | 0 | 0 | 0 | 0 |
| 14 | 0 | 0 | 0 | 0 | 0 | 0 | 0 | 1 |
| 13 | 0 | 0 | 0 | 0 | 0 | 1 | 0 | 0 |
| 12 | 0 | 0 | 0 | 0 | 0 | 2 | 0 | 0 |
| 11 | 0 | 0 | 0 | 0 | 0 | 0 | 2 | 0 |
| 10 | 0 | 0 | 0 | 0 | 0 | 2 | 0 | 0 |
| 9 | 0 | 0 | 0 | 0 | 0 | 1 | 2 | 0 |
| 8 | 1 | 0 | 0 | 0 | 0 | 0 | 1 | 0 |
| 7 | 2 | 1 | 0 | 0 | 0 | 1 | 1 | 1 |
| 6 | 1 | 2 | 1 | 0 | 0 | 1 | 2 | 1 |
| 5 | 1 | 1 | 2 | 2 | 1 | 0 | 0 | 0 |
| 4 | 1 | 1 | 1 | 1 | 1 | 0 | 1 | 0 |
| 3 | 0 | 1 | 1 | 2 | 0 | 1 | 2 | 0 |
| 2 | 0 | 1 | 1 | 2 | 1 | 0 | 1 | 0 |
| 1 | 0 | 0 | 1 | 1 | 1 | 1 | 1 | 1 |
| 0 | 0 | 0 | 0 | 1 | 2 | 0 | 1 | 1 |

FIG. 12

| NORMALIZED COUNT | 0.0938 | 0.1094 | 0.1094 | 0.1406 | 0.0938 | 0.1562 | 0.2188 | 0.0781 |
|---|---|---|---|---|---|---|---|---|
| $C_r$ | 0<br>1 | 2<br>3 | 4<br>5 | 6<br>7 | 8<br>9 | 10<br>11 | 12<br>13 | 14<br>15 |

FIG. 13

| $\lambda(C_r)$ | 0.1149 | 0.1210 | 0.1210 | 0.1315 | 0.1149 | 0.1362 | 0.1524 | 0.1081 |
|---|---|---|---|---|---|---|---|---|
| $C_r$ | 0<br>1 | 2<br>3 | 4<br>5 | 6<br>7 | 8<br>9 | 10<br>11 | 12<br>13 | 14<br>15 |

FIG. 14

| $\lambda(C_r)$: 0.1149 0.1210 | 0.1210 0.1315 0.1149 | 0.1362 0.1524 0.1081 |
|---|---|---|
| "AREA" = 0.236 | "AREA" = 0.367 | "AREA" = 0.397 |

FIG. 15

| $B_{21}$ | | $B_{22}$ | | | $B_{23}$ | | |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 1 | 0 | 0 |
| 0 | 0 | 0 | 0 | 0 | 2 | 0 | 0 |
| 0 | 0 | 0 | 0 | 0 | 0 | 2 | 0 |
| 0 | 0 | 0 | 0 | 0 | 2 | 0 | 0 |
| 0 | 0 | 0 | 0 | 0 | 1 | 2 | 0 |
| 1 | 0 | 0 | 0 | 0 | 0 | 1 | 0 |
| 2 | 1 | 0 | 0 | 0 | 1 | 1 | 1 |
| 1 | 2 | 1 | 0 | 0 | 1 | 2 | 1 |
| 1 | 1 | 2 | 2 | 1 | 0 | 0 | 0 |
| 1 | 1 | 1 | 1 | 1 | 0 | 1 | 0 |
| 0 | 1 | 1 | 2 | 0 | 1 | 2 | 0 |
| 0 | 1 | 1 | 2 | 1 | 0 | 1 | 0 |
| 0 | 0 | 1 | 1 | 1 | 1 | 1 | 1 |
| 0 | 0 | 0 | 1 | 2 | 0 | 1 | 1 |

Y (rows); $C_r$ (columns)

FIG. 16

| | | | | | | | | |
|---|---|---|---|---|---|---|---|---|
| $\lambda(C_r)$: | 0.1149 | 0.1210 | 0.1210 | 0.1315 | 0.1149 | 0.1362 | 0.1524 | 0.1081 |
| | "AREA" = 0.2359 | | "AREA" = 0.2525 | | "AREA" = 0.2511 | | "AREA" = 0.2605 | |

| $B_{21}$ | | $B_{22}$ | | $B_{23}$ | | $B_{24}$ | |
|---|---|---|---|---|---|---|---|
| 0 | 0 | 0 | 0 | 0 | 0 | 0 | 0 |
| 0 | 0 | 0 | 0 | 0 | 0 | 0 | 1 |
| 0 | 0 | 0 | 0 | 0 | 1 | 0 | 0 |
| 0 | 0 | 0 | 0 | 0 | 2 | 0 | 0 |
| 0 | 0 | 0 | 0 | 0 | 0 | 2 | 0 |
| 0 | 0 | 0 | 0 | 0 | 2 | 0 | 0 |
| 0 | 0 | 0 | 0 | 0 | 1 | 2 | 0 |
| 1 | 0 | 0 | 0 | 0 | 0 | 1 | 0 |
| 2 | 1 | 0 | 0 | 0 | 1 | 1 | 1 |
| 1 | 2 | 1 | 0 | 0 | 1 | 2 | 1 |
| 1 | 1 | 2 | 2 | 1 | 0 | 0 | 0 |
| 1 | 1 | 1 | 1 | 1 | 0 | 1 | 0 |
| 0 | 1 | 1 | 2 | 0 | 1 | 2 | 0 |
| 0 | 1 | 1 | 2 | 1 | 0 | 1 | 0 |
| 0 | 0 | 1 | 1 | 1 | 1 | 1 | 1 |
| 0 | 0 | 0 | 1 | 2 | 0 | 1 | 1 |

$C_r$

| $\lambda(Y\|B_{21})$ | 0 | 0 | 0.1190 | 0.1190 | 0.1499 | 0.1499 | 0.1716 | 0.1716 |
|---|---|---|---|---|---|---|---|---|
| Y | 0 | 1 | 2 | 3 | 4 | 5 | 6 | 7 |

A — B

| $\lambda(Y\|B_{22})$ | 0.1112 | 0.1401 | 0.1604 | 0.1604 | 0.1401 | 0.1765 | 0.1112 |
|---|---|---|---|---|---|---|---|
| Y | 0 | 1 | 2 | 3 | 4 | 5 | 6 |

C — D

| $\lambda(Y\|B_{23})$ | 0.0966 | 0.0966 | 0.0767 | 0.0767 | 0.0767 | 0.0767 | 0.0767 |
|---|---|---|---|---|---|---|---|
| Y | 0 | 1 | 2 | 3 | 4 | 5 | 6 |

E — F

| $\lambda(Y\|B_{24})$ | 0.0969 | 0.0969 | 0.0769 | 0.0969 | 0.0769 | 0 | 0.1109 | 0.0969 |
|---|---|---|---|---|---|---|---|---|
| Y | 0 | 1 | 2 | 3 | 4 | 5 | 6 | 7 |

G — H

| A | 0.1190 | 0 | 0 | 0 | 0 | 0 | 0 | 0 |
|---|---|---|---|---|---|---|---|---|
| B | 8 | 9 | 10 | 11 | 12 | 13 | 14 | 15 |

| C | 0 | 0 | 0 | 0 | 0 | 0 | 0 | 0 |
|---|---|---|---|---|---|---|---|---|
| D | 7 | 8 | 9 | 10 | 11 | 12 | 13 | 14 | 15 |

| A | 0.1190 | 0 | 0 | 0 | 0 | 0 | 0 |
|---|---|---|---|---|---|---|---|
| B | 8 | 9 | 10 | 11 | 12 | 13 | 14 | 15 |

| C | 0 | 0 | 0 | 0 | 0 | 0 | 0 | 0 |
|---|---|---|---|---|---|---|---|---|
| D | 7 | 8 | 9 | 10 | 11 | 12 | 13 | 14 | 15 |

| E | 0.0767 | 0 | 0.0767 | 0.0966 | 0 | 0.0966 | 0.0767 | 0 | 0 |
|---|---|---|---|---|---|---|---|---|---|
| F | 7 | 8 | 9 | 10 | 11 | 12 | 13 | 14 | 15 |

| G | 0.0769 | 0.0969 | 0 | 0.0969 | 0 | 0 | 0 | 0.0769 | 0 |
|---|---|---|---|---|---|---|---|---|---|
| H | 8 | 9 | 10 | 11 | 12 | 13 | 14 | 15 |

| Y \ $C_r$ | 0<br>1 | 2<br>3 | 4<br>5 | 6<br>7 | 8<br>9 | 10<br>11 | 12<br>13 | 14<br>15 |
|---|---|---|---|---|---|---|---|---|
| 15 | 0 | 0 | 0 | 0 | 0 | 0 | 0 | 0 |
| 14 | 0 | 0 | 0 | 0 | 0 | 0 | 0 | 1 |
| 13 | 0 | 0 | 0 | 0 | 0 | 1 | 0 | 0 |
| 12 | 0 | 0 | 0 | 0 | 0 | 2 | 0 | 0 |
| 11 | 0 | 0 | 0 | 0 | 0 | 0 | 2 | 0 |
| 10 | 0 | 0 | 0 | 0 | 0 | (2) | (0) | 0 |
| 9 | 0 | 0 | 0 | 0 | 0 | 1 | 2 | 0 |
| 8 | 1 | 0 | 0 | 0 | 0 | 0 | 1 | 0 |
| 7 | (2) | 1 | 0 | 0 | 0 | 1 | 1 | 1 |
| 6 | 1 | 2 | 1 | 0 | 0 | 1 | 2 | 1 |
| 5 | 1 | 1 | (2) | 2 | 1 | 0 | 0 | 0 |
| 4 | (1) | 1 | 1 | 1 | 1 | 0 | 1 | 0 |
| 3 | 0 | 1 | 1 | 2 | 0 | 1 | (2) | 0 |
| 2 | 0 | 1 | (1) | 2 | (1) | 0 | 1 | 0 |
| 1 | 0 | 0 | 1 | 1 | 1 | 1 | 1 | 1 |
| 0 | 0 | 0 | 0 | 1 | 2 | 0 | 1 | 1 |

FIG. 21

| INDEX FROM $C_r$ LUT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1 | 1 | 1 | 1 | 1 | 1 | 1 | 2 | 2 | 2 | 2 | 2 | 2 | 2 | 2 | 2 | 2 |
| 2 | 3 | 3 | 3 | 3 | 4 | 4 | 4 | 4 | 4 | 4 | 4 | 4 | 4 | 4 | 4 | 4 |
| 3 | 5 | 5 | 5 | 5 | 5 | 5 | 5 | 6 | 6 | 6 | 6 | 6 | 6 | 6 | 6 | 6 |
| 4 | 7 | 7 | 7 | 7 | 7 | 7 | 7 | 8 | 8 | 8 | 8 | 8 | 8 | 8 | 8 | 8 |

FIG. 22

| LUT INDEX | $\bar{Y}$ | $\bar{C}_r$ |
|---|---|---|
| 1 | 4 | 1 |
| 2 | 7 | 1 |
| 3 | 2 | 5 |
| 4 | 5 | 5 |
| 5 | 2 | 9 |
| 6 | 10 | 10 |
| 7 | 3 | 13 |
| 8 | 10 | 13 |

FIG. 23

| | | | | | | | |
|---|---|---|---|---|---|---|---|
| 2 | 2 | 4 | 4 | 5 | 5 | 6 | 5 |
| 2 | 2 | 4 | 4 | 6 | 7 | 6 | 6 |
| 2 | 2 | 4 | 4 | 6 | 7 | 8 | 7 |
| 2 | 1 | 4 | 3 | 5 | 7 | 8 | 7 |
| 1 | 1 | 3 | 3 | 5 | 8 | 7 | 8 |
| 1 | 3 | 3 | 5 | 6 | 7 | 7 | 7 |
| 1 | 3 | 3 | 5 | 5 | 8 | 8 | 7 |
| 1 | 3 | 3 | 5 | 6 | 8 | 7 | 8 |

FIG. 24

SEQUENTIAL SCALAR QUANTIZATION OF DIGITAL COLOR IMAGE USING MEAN SQUARED ERROR-MINIMIZING QUANTIZER DENSITY FUNCTION

CROSS-REFERENCE TO RELATED APPLICATIONS

The present application is a continuation-in-part of co-pending U.S. patent application Ser. No. 07/833,529, filed Feb. 11, 1992, by Jan P. Allebach et al, entitled "Sequential Product Code Quantization of Digital Color Image," the disclosure of which is incorporated herein.

FIELD OF THE INVENTION

The present invention relates in general to the processing of digital color images, and is particularly directed to a mechanism for performing sequential scalar quantization of a digital color image of a relatively high color digital encoding precision into a reduced number or 'palette' of digital color codes, such that, when read out of memory, the respective color codes of the 'palette' will produce an output color image having a high quality that is pleasing to the human visual system (HVS).

BACKGROUND OF THE INVENTION

As described in the above-referenced co-pending application, many color image processing systems employ a reduced complexity (low cost) output (display) device that accesses a relatively small data resolution image frame buffer to define the contents of the displayed image. Namely, the image frame buffer has a storage capacity (typically on the order of eight bits per pixel), which is considerably less than that necessary to accommodate the encoding resolution (e.g. twenty-four bits per pixel) into which an original color image has been digitized by a color opto-electronic imaging device, such as a high precision digitizing color camera. Since the output (e.g. color display) device usually has a resolution of eight bits per color at the input of each of three respective digital-to-analog converters which drive its red, green and blue signal ports, it is possible for the output device to replicate any of the colors within the original image, as long as a code representative of that particular color is stored in the frame buffer.

Unfortunately, the limited capacity of an eight bit frame buffer means that only 256 color codes, out of the approximately 16 million possible colors codes available to define the original digital color image, can be stored in the frame buffer. As a consequence, it is necessary to employ a color conversion mechanism through which each of the colors of the original input digitally encoded image (e.g. out of a possibility of $2^{24}=1.6\times10^{7}$ colors) is effectively transformed, or quantized, into one of a lesser number of output colors (e.g. $2^{8}=256$ colors) for driving the display device.

Color quantization has been the fundamental technique for reducing the color code resolution of the original color image size to a limited palette of color codes that can be accommodated by a limited code resolution frame buffer, and which are selected to as faithfully as possible replicate the color characteristics of the original image. Color quantization typically has involved the use of some form of vector quantization and operates to minimize an objective error criterion (usually mean squared error).

One class of quantization techniques, as described in articles by P Heckbert, entitled "Color image quantization for frame buffer display," Computer Graphics, Vol. 16, No. 3, pp 297–307, July 1972, G. Braudaway, entitled "A procedure for optimum choice of a small number of colors from a large color palette for color imaging," Electronic Imaging '87, San Francisco Calif., 1987 and R. Gentile et al entitled "Quantization of color images based on uniform color spaces," Journal of Imaging Technology, Vol. 16, No. 1, pp 12–21, February 1990, selects an initial color palette and iteratively refines this palette, using the algorithm described in an article by Y. Linde et al, entitled "An algorithm for vector quantizer design," IEEE Transactions on Communications, Vol. COM-28, pp 84–95, January 1980. While these vector quantization mechanisms yield high quality images, they are very computationally intensive.

Another approach involves generating a set of color clusters and using the centroids of the clusters as palette colors. This scheme is described, for example, in an article entitled "Quantization of color images for display/printing on limited color output devices," by S. S. Dixit, Comput. & Graphics, vol. 15, no. 4, pp. 561–567, 1991, and in an article by R. Balasubramanian et al, entitled "A new approach to palette selection for color images," Journal of Imaging Technology, Vol. 17, No. 6, pp. 284–290, December 1991, and is based upon a clustering vector quantization technique proposed in an article by W. Equitz entitled "A new vector quantization algorithm," IEEE Transactions on Acoustics, Speech, Signal Processing, Vol. 37, No. 10, pp 1568–1575, October 1989.

In accordance with this clustering approach, all of the colors of an image are grouped into 'clusters', by merging nearest neighbor pair of clusters, one at a time, until the number of clusters equals the desired number of palette colors. The centroids of the clusters are selected as the palette colors. Tree structures are used to perform efficient nearest neighbor searches. In addition, this scheme employs histogramming to reduce the number of initial colors and a spatial activity weighting to take into account the sensitivity of the human visual system to quantization errors in relatively 'smooth' regions of the image.

A third class of vector quantization algorithms uses 'splitting' techniques to divide or 'split' the color space into smaller sub-regions and selects a representative palette color from each sub-region. In general, splitting techniques are computationally more efficient than either of the iterative or merging techniques and can provide a structure to the color space that enables efficient pixel mapping at the output.

One of these splitting techniques, termed a 'median cut' algorithm and described, for example, in an article by P. Heckbert, entitled "Color image quantization for frame buffer display," Computer Graphics, vol. 16, no. 3. pp. 297–307, July 1982, recursively splits a region into two sub-regions by locating a plane perpendicular to the coordinate axis having the greatest range (where the range is the difference between the maximum and minimum values of that coordinate) and which passes through the median point of that coordinate axis.

A second splitting technique is a variance-based algorithm which splits the region having the largest total squared error (TSE). Data points are projected onto each of the coordinate axes and the projected TSEs computed. The region is then split along that axis yielding the smallest sum of projected TSEs from the two resulting sub-regions. For a detailed discussion of the variance splitting algorithm attention may be directed to an article by S. Wan et al, entitled "Variance based color image quantization for frame buffer display", COLOR Research and Applications, Vol. 15, No. 1, pp 52–58 February 1990.

A third splitting algorithm, which is the most optimal in a quantitative sense, is the binary splitting algorithm. The binary splitting algorithm passes a splitting plane through the centroid of all the colors of the region, such that the splitting plane is oriented perpendicular to the direction of maximum total squared variation. The latter is derived from the principal eigenvalue and eigenvector of the covariance matrix of the data in that region. At each step the region to be split is that with the largest associated principal eigenvalue. The binary splitting algorithm also incorporates spatial activity measures to enhance the subjective quality of the image. For a detailed discussion of the binary splitting algorithm attention may be directed to an article by M. Orchard et al, entitled "Color quantization of images", IEEE Transactions on Signal Processing Vol. 39, No. 12, pp 2677–2690, December 1991, and the U.S. patent to Bouman et al, U.S. Pat. No. 5,047,842, issued Sep. 10, 1991, entitled "Color Image Display with a Limited Palette Size."

In our above-referenced co-pending application, we describe a sequential product code vector quantization technique that incorporates the binary splitting technique, as part of the overall color code transformation process, for quantizing chrominance and luminance features of an image, based upon a conditional distribution of these features within partitioned regions of chrominance/luminance color space. Advantageously, this sequential product code scheme yields a set of reduced codewidth input, coordinate conversion look-up tables which, when cascaded together, yield a transform operator that rapidly converts the color value of each pixel of an original image into an output image color code, the output image color code both closely matching the color of the original image and being spatial activity dependent, so as to prevent the generation of contouring artifacts in the reproduced image.

The operation of the binary splitting-based sequential product code vector quantization mechanism described in our above-referenced co-pending application may be understood by reference to FIGS. 1–5, which contain a reduced complexity illustration of three dimensional axial splitting of a YCC (Y,Cr,Cb) color space along its respective axes into respective color space cells, corresponding identity codes for which yield an intended output color code palette.

Referring initially to FIG. 1, a three dimensional rectangular coordinate color space distribution (histogram) of luminance and chrominance components of an image, defined in terms of a luminance axis Y, and a pair of chrominance axes Cr and Cb mutually orthogonal to one another and to the luminance axis Y, is diagrammatically illustrated as having the shape of a histogram cube 21. Namely, in the present example, cube 21 is considered to contain the entire color space distribution of all of the luminance and chrominance components that define the image of interest. The objective of the binary splitting mechanism is to sequentially quantize this color space distribution into a reduced set of respective color codes of a 'palette' that will produce an output color image having a high quality that is pleasing to the human visual system (HVS). For this purpose, the color space cube 21 is subject to a sequence of binary splits along each of its respective axes to produce a set of rectangular solid-shaped color space cells or blocks, the respective sides of which are defined by respective splits that are orthogonal to the three axes (Y,Cr,Cb).

Let it be initially assumed that the number of splits allowed is a relatively small number such that the original color space is to be split twice (into three slices) along the Cr axis, each of the three resulting slices of the (Cr axis-partitioned) color space is to be split once along the Cb axis, and each of the six resulting columns of the (Cr and Cb axis-partitioned) color space is to be split twice along the Y axis. It should be observed that the number and locations of the splits in the present example are merely for purposes of illustration and each constitutes an arbitrary choice. It should also be noted that, in a practical application, it is not always the case that every partitioned subcomponent (slice, column) of the original color space will be further partitioned. (In a practical image, for an eight bit display buffer, the total number of quantization levels is 256, where each of the two chrominance axes has a relatively small number of quantization partitions (e.g. on the order of eight splits each), with the vast majority of quantization partitions (well over 200) lying along the luminance axis, because of the greater sensitivity of the human visual system to luminance variations than to chrominance variations.)

In the present example of splitting the Cr axis first, followed by splitting along the Cb axis, the original color space cube of FIG. 1 is subdivided or partitioned along Cr axis split planes SP1, SP2 into three parallel slices 31, 32 and 33, as diagrammatically illustrated in FIG. 2, with each split plane SPi being orthogonal to the respective axis being split. (It should be noted that were the original color space of FIG. 1 subjected to a single split along the Cb axis prior to partitioning along the Cr axis, then the cube of FIG. 1 would be subdivided or partitioned as diagrammatically illustrated in FIG. 3 along a single split plane SP3 into two parallel slices 41 and 42.)

For the present example of splitting the color space cube of FIG. 1 along the Cr axis first, followed by a splitting each of the resulting slices along the Cb axis, then, as diagrammatically illustrated in FIG. 4, each of the three slices 31, 32, 33 of FIG. 2 will be partitioned along split planes SP4, SP5 and SP6 into two sub-slices or columns, yielding a total of six columns: 31-1, 31-2; 32-1, 32-2; and 33-1, 33-2. It should be noted that although each split plane SP4, SP5, SP6 subdivides a respective slice 31, 32, 33 into sub-slices, the locations of the splits are not necessarily and are not expected to be coplanar with one another. Moreover, as noted previously, in any image application, the splitting mechanism will not necessarily effect a partitioning or split through each slice. The location of each respective split plane is based upon an evaluation of the particular color space being split by that split plane, such that the splitting plane passes through the centroid of all the colors of the color space region being split.

As discussed above, for the case of an initial single split of the original color space cube 21 of FIG. 1 by way of the Cb axis split plane SP3 of FIG. 3, the color space being split is the entire cube, so that the location of a split plane SP3 is based upon an evaluation of the color space distribution of the entire color space cube 21. Once the cube 21 has been subdivided into slices, however, the location of each subsequent split of the resulting slices will depend upon the color space contents of each respective slice, not the original color space cube 21. Thus, a dual axis splitting of the original color space cube 21, along the Cb axis first, followed by the Cr axis, will produce a different set of sub-slices or columns than that shown in FIG. 4, thereby changing the composition of the color space palette that will be obtained after the third and final split along the Y axis.

In accordance with the sequential quantization methodology described in out co-pending application, which of the two chrominance axes (Cr, Cb) is chosen to begin the sequential splitting process is that chrominance axis which, when split, realizes a larger reduction in total squared error. The criterion used to determine the sequential order of partitioning of the axis is equal to the product of the number of data values projected upon the segment of the axis to be split and the variance of the data along that segment of the axis. That axis segment having the largest splitting criterion is split first. After a segment has been split into two sub-segments, respective splitting criteria are then computed for the sub-segments and compared with the splitting criteria for all other segments of the axis. Again, whichever segment (or sub-segment) of the axis has the largest splitting criterion is split next. This process is repeated either until the axis has been partitioned into the number of splits initially assigned to it.

For the illustrative example of FIG. 4, which depicts the result of splitting the original color space cube 21 of FIG. 1 into three slices along the Cr axis first, followed by a split of each of the three resulting slices into six color space columns along the Cb axis, a third and final split of the distribution of the columns of FIG. 4 along the Y axis is diagrammatically illustrated in FIG. 5. In the present example of splitting each of the six columns of FIG. 4 twice, there are twelve splits SP7–SP17, shown in FIG. 5, producing a total of eighteen cells or blocks: 31-1-1, 31-1-2, 31-1-3, 31-2-1, 31-2-2, 31-2-3, 32-1-1, 32-1-2, 32-1-3, 32-2-1, 32-2-2, 32-2-3 , 33-1-1, 33-1-2 , 33-1-3 , 33-2-1, 33-2-2 and 33-2-3. Again because the location of the splits of an individual column is based upon an evaluation of the color space distribution of the columns resulting from the immediately preceding split (along the Cb axis in the present example), the locations of the pairs of splits of each of the columns can be expected to be different for the respective columns.

Because of the increased sensitivity of the human visual system to low spatial activity, the splitting criterion along the luminance (Y) axis is weighted in inverse proportion to the average spatial activity of the region subject to be split. The number of splits along each respective axis determines the number of cells or blocks into which the histogram color space is subdivided, and thereby determines the number of colors of the palette. As noted above, for an eight bit display buffer, the total number of available palette codes is 256; each of the chrominance axes may be split at seven or eight locations, while there may be on the order of 240 splits of the partitioned chrominance regions into luminance-chrominance subregions. This large number of splits along the luminance axis has been found to effectively eliminate objectionable contouring artifacts, thereby resulting in a high quality image that is pleasing to the human visual system. After the quantization of the color space, the luminance and chrominance codes are reconverted back into respective R, G and B code values. A video memory in which palette color labels are stored may be coupled to a look-up table which generates RGB values associated with the palette color labels.

SUMMARY OF THE INVENTION

Now although the binary splitting-based, sequential product code vector quantization scheme described in our above-referenced co-pending application has the effect of reducing the computational cost of the splitting operation and, at the same time, preserving a high level of image quality, we have discovered a new quantizing mechanism, hereinafter referred to as sequential scalar quantization (SSQ), which is operative to sequentially quantize the scalar components of an image vector in a manner that enables the output palette to be derived in an optimal, highly efficient manner, while providing image quality that is comparable with or superior to that obtained from conventional vector quantization techniques.

More particularly, rather than operate directly upon the color space histogram, the sequential scalar quantization mechanism of the present invention operates on an asymptotically optimal probability density function of the histogram, referred to as a Lambda function, which specifies the relative spacing of quantization levels along the respective axes of the color space, while minimizing mean squared error along the respective axis being split. Although the Lambda function is an asymptotically based quantizing operator, which is customarily associated with continuous probability density functions having a very large number of quantization levels, we have found that the Lambda function works quite well with a relatively reduced number of quantization levels (e.g. on the order of 256 associated with an eight bit frame buffer of an color display device). A particularly useful attribute of the Lambda quantizing mechanism is the fact that it provides a prediction of mean squared error, without having to actually perform the quantization or calculate the mean squared error, thereby facilitating a determination of which of the two chrominance axes should be split first. In addition, unlike binary splitting, which looks at the result of each successive split along a respective axis in order to determine where to perform the next split along that axis, the Lambda function is operative to define the locations of all splits along a respective axis as a parallel signal processing mechanism, thereby enhancing processing speed.

Using the asymptotic Lambda function operator to specify the relative spacing of quantization levels in the neighborhood of x, a quantity NL(x)dx may be defined as the number of quantization levels along an arbitrary color space to axis in the interval [x, x+dx]. By definition, the Lambda function L(x) integrates to a value of 1. As a result, respective splits along the x axis of the Lambda function are located at x values which demarcate areal segments under the Lambda curve, each areal segment being equal to the total area under the curve, namely the value 1, divided by N.

Since a typical three dimensional color space histogram of a digital image is a distribution of discrete values, rather than a continuous function, the Lambda function is calculated as a summation of the discrete values. As in the case of the binary splitting mechanism described in our above-referenced co-pending application, quantization splits are initially conducted along the respective chrominance axes, followed by the luminance axis. Namely, the Lambda function of the (YCC) color space histogram along the first chrominance axis (either Cr or Cb) is quantized into some number of N1 levels. This operation partitions the three dimensional color space (Y,Cr,Cb) into N1 slices $B_{2j}$ (where j=1 . . . N1).

For j=1 . . . N1, a respective jth slice $B_{2j}$ is then quantized along the second coordinate axis (either Cb or Cr) into $n_{2j}$ levels, so as to further partition the color space into N2 columns $B_{3j}$ that are parallel with the remaining yet to be quantized luminance coordinate axis Y. Then, for j=1 . . . N2, respective jth columns $B_{3j}$ are quantized along the luminance axis Y into $n_{3j}$ levels, so as to partition the color space into N3 rectangular parallelpiped cells. Thus, the total number N (i.e. N3) of output cells from which the color codes of the color palette are derived is equal to the number of rectangular parallelpipeds resulting from the final quantization operation.

In the course of executing the quantization process, the choice of which chrominance axis is partitioned first is based upon which order of chrominance axis quantization 'splits' yields the smaller total mean squared error. In order to determine mean square error, it is necessary to ascertain the optimum number of splits for each axis. For this purpose, initial empirical estimates are chosen for the numbers of splits along the respective chrominance axes. Using the empirical estimate for the first number of splits, the Lambda function quantizing procedure is performed along a first (e.g. Cr) chrominance axis. Within each quantization cell resulting from partitioning the first chrominance axis, an output quantization value is selected as the centroid of a respective cell. After performing the slice segmentation process along the first chrominance axis, the quantization procedure for quantizing the Lambda function of the histogram is carried out along the second (e.g. Cb) chrominance axis.

After quantizing along the two chrominance (Cr, Cb) axes, using empirical estimates for the number of splits for each respective axis, preliminary mean squared error values for the respective chrominance axes are calculated using differences between the output color code values obtained above and original color values of the digital image. A preliminary mean square error for the luminance axis is also calculated. Advantageously, the use of the Lambda function permits the error along the luminance axis to be estimated without having to actually quantize along the luminance axis.

Given these three preliminary mean square error values, a set of empirical constants to be employed in an expression for total mean squared error are calculated. The values calculated for the empirical constants and the calculated values of mean squared error are employed to determine 'optimal' split number values. The optimal values and the values calculated for the empirical constants are next used to calculate total mean squared error for the three dimensional color space. In the expression for total mean squared error, each of the summed components corresponds to the mean square error along a respective one of the axes Cr, Cb and Y.

After calculating the total mean squared error for the three dimensional color space based upon the first selected chrominance axis order of quantization (e.g. Cr first, Cb second), the process is repeated, with the chrominance axis order reversed (e.g. Cb first, Cr second). That chrominance axis order which yields the lower of the two total mean squared error values is then selected as the order to perform the complete quantization procedure (including the luminance axis Y).

The complete quantization procedure is then conducted, using the chrominance axis order with has been determined to yield the lowest total mean squared error value and the previously calculated optimal numbers. During the complete quantization procedure, the optimal split number $N1_{opt}$, determined for the first chrominance axis is used to define the number of slices that are split along the first chrominance axis. It is also used to determine the optimal number of quantization levels $n_{2j}$ within each slice $B_{2j}$, where j=1 . . . $N1_{opt}$, when quantizing along the second coordinate axis (Cb or Cr). The optimal number $N2_{opt}$ for the second chrominance axis is used to calculate the optimal number of quantization levels $n_{3j}$ within each slice $B_{3j}$, where j=1 . . . $N2_{opt}$, when quantizing along the third coordinate (luminance) axis Y.

Once the above-described three dimensional quantization of the Lambda quantizer density function of the histogram of the digital color image of interest has been completed, actual chrominance and luminance values used to define each color code of the (256 component) palette are the Cr, Cb and Y coordinates of the centroids of the respective quantization cells of the partitioned color space, the centroid values being tabulated in a palette color map. In order to map the palette values tabulated in the palette color map into the image array, an output image map is created. The output map spatially associates each of the pixels of the image array with one of the numerical values of the respective YCC cells of the histogram. A video memory in which palette color labels are stored may be coupled to a look-up table, which generates RGB values associated with the palette color labels. The RGB outputs of the look-up table are then applied to respective DA converters associated with the RGB ports of an image output device, so that an output image displayed thereby will faithfully replicate the color content of the original digital image, even though the number of color codes stored in the attendant frame buffer is considerably less than the number of color codes capable of being specified by the encoding resolution of the digital image.

Although the total number N of quantization cells into which the color space distribution is sequentially quantized along its Cr, Cb and Y axes may correspond to the full encoding resolution of the frame buffer, because partitioning of the Lambda function into N regions of equal area involves subdividing the area under the entire function without regard to variation of its distribution, the possibility exists that the contents of a region are not accurately represented by a centroid color value, which will cause isolated spots in the output image to have visually perceptible color errors.

In accordance with the present invention, this potential problem is obviated by using less than the full encoding resolution of the frame buffer to perform initial quantization of the color space distribution along its Cr, Cb and Y axes, thereby reserving a portion of the capacity of the frame buffer for post quantization adjustment, and then performing corrective partitioning of regions observed to contain substantial variations between their associated output color code values and input color values of the original color space distribution. As a non-limitative example, five percent of the capacity of the frame buffer may be reserved for corrective partitioning.

Corrective partitioning of an area where post correction is to be effected is performed by locating an additional split of a region to be further partitioned at a point midway of the data within the area under the curve. This causes that region to be further partitioned into a pair of sub-regions, so that the total Lambda function is now partitioned into N+1 segments, such that the contents of a subdivided region will be accurately represented by two color values, which effectively corrects for what would otherwise be visually perceptible isolated color errors in the output image.

Because, in general, the human visual system is more sensitive to luminance variations than to chrominance variations, particularly in the case of color quantization, where the most visible artifact is customarily contouring effects in luminance, the luminance value of mean square error is weighted to be K times more significant than mean squared error along the chrominance axes of the color space. The larger the value of the luminance weighting factor K, the smaller the number of quantization levels for the respective chrominance axes. Based upon experimental investigation, it has been found that a value of K=4 satisfactorily reduces objectionable luminance contouring artifacts.

In addition to taking into account the increased sensitivity of the human visual system for errors in luminance than in chrominance, the Lambda quantization process may also be enhanced to accommodate for the increased sensitivity of the human visual system to quantization errors in relatively smooth (low spatial activity) rather than 'busy' (high spatial activity) regions of the image. For this purpose, the original digital image is subdivided into blocks of pixels (e.g. blocks of eight rows by eight columns of pixels, totalling sixty-four pixels per block). At each pixel location (m,n) within each block 1 of the image, a gradient measure of the variation of luminance Y is defined. An average $\alpha_{eL}$ of the luminance gradient values of the block 1 is then computed. Using this average value $\alpha_{eL}$, a block weighting value $w_L$ that is inversely related to the spatial activity within block 1 is then computed. The expression for $w_L$ effectively limits the dynamic range of the activity measure to lie between a value of 2 (corresponding to flat or no spatial activity regions) and a value of 22 (corresponding to an edge or high spatial activity) regions. For each color $c_i$ within the histogram, a subjective weight $w_{ci}$ is assigned as the average of the block weights $w_L$ for each block in which the color $c_i$ appears. Then, during the quantization of respective columns $B_{3j}$ of the Lambda function along the luminance axis Y, the number of levels $n_{3j}$ to be assigned to a respective column is modified by $w'_j$, which is the average of the subjective weights $w_{ci}$ of all colors $c_i$ in the column $B_{3j}$. If a particular cell $B_{3j}$ contains colors from mainly smooth spatial areas of the image, it will have a larger weight $w'_j$ and therefore a larger associated quantization allocation $n_{3j}$. Thus, more quantization levels are assigned to colors located in smoothly varying image regions.

To make optimum use of a color palette obtained in accordance with the present invention, it is desirable that the color palette be image-independent, which makes it possible to process multiple images using the same color palette for simultaneous display. Unfortunately, the image quality obtained from an image independent color palette is lower than that obtained from an image-dependent color palette.

Pursuant to a further aspect of the present invention, using the above described Lambda processor, we have developed a mechanism to obtain an image-independent color palette, which is optimally distributed in a visually uniform (L,a,b) color space, and which is employed in conjunction with an error diffusion technique, to distribute errors at higher frequencies and thereby reduce human visual sensitivity to those errors. Although error diffusion is customarily conducted in the (L,a,b) color space, by proper choice of YCC color space, the use of YCC/Lab transform operators becomes unnecessary, thereby reducing computational intensity.

In accordance with a first step in the design of the optimum image-independent color palette, the image-dependent color space histogram is replaced with a universal color distribution. The output color palette is to be generated in terms of the L,a,b color space, since the human visual sensitivity to color changes is approximately uniform in L,a,b space. This universal distribution is obtained by assuming that the image colors are uniformly distributed in the L,a,b space over the operational gamut of the display device.

To create a color palette that is visually pleasing, the image-dependent sequential scalar quantization mechanism is modified with respect to the manner in which the one-dimensional quantization levels are computed, and the order of quantization is always fixed with the color space being quantized along the L-axis first, a-axis second, and b-axis third. Computation of a one dimensional quantization level involves allocating a number of n quantization levels along axis x, using the marginal histogram distribution p(x). Since the image-independent quantizer is to be used in conjunction with error diffusion, it is important that the quantization levels span the complete range of colors. Consequently, the quantization levels are selected with the constraint that the first and last quantization levels span the minimum and maximum possible colors of the distribution.

After the image quantization levels are selected and the color space is partitioned along axis x, into n segments or sets, new quantization levels are defined such that they are located at the centroids of their respective partitioned regions. The values of the quantization levels are then used as output colors, since they are guaranteed to fall within the output color gamut.

While error diffusion may be performed in a color coordinate system which is linearly related to the RGB components, improved performance has been realized by employing a new opponent color space and processing the chrominance components (Cr, Cb) differently than the luminance (Y) components. A new opponent color space which results in a computationally efficient implementation of the sequential scalar quantizer is employed.

More particularly, $Y_yC_xC_z$ coordinates are defined by a specific set of relationships in terms of $X_n$, $Y_n$ and $Z_n$, which are the XYZ color coordinates of the standard D65 white point. The $Y_yC_xC_z$ coordinates are closely related to the (L,a,b) coordinates. The sequential scalar quantizer is specified in L,a,b coordinates so that it is visually uniform. However, the error diffusion mechanism processes imagery data in $Y_yC_xC_z$ (YCC) coordinates. Because employing a color space transformation adds computational complexity to the error diffusion mechanism, it is preferable to apply the sequential scalar quantizer directly to the YCC components.

For this purpose, since the function f() is a monotonically increasing function, quantization of L may be replaced by an equivalent quantization of $Y_y$. The second component 'a' is dependent upon the value of $Y_y$ and $C_x$. However, the value of $Y_y$ may be replaced with the quantized value $Q_y[Y_y]$. Quantization of 'a' is then equivalent to quantization of $C_x$. Computation of the third component 'b' is similarly computed.

BRIEF DESCRIPTION OF THE DRAWINGS

FIG. 11 diagrammatically illustrates an eight-by-eight matrix of encoded luminance (Y) values of the Y,Cb,Cr-transformed image associated with each of the pixels of the $8\times8$ array of FIG. 10;

FIG. 12 is a two-dimensional histogram of the pixel population of the matrices of FIGS. 10 and 11;

FIG. 13 shows luminance values tabulated in each of the respective Cr columns of the histogram of FIG. 12 normalized with respect to the number of pixels in the image;

FIG. 14 shows tabulated values produced by the Lambda function of the marginal histogram of FIG. 13;

FIG. 15 shows respectively adjacent areas resulting from partitioning the discrete values listed in FIG. 14;

FIG. 16 shows a partitioned Y-Cr space resulting from applying the partitioning boundaries of FIG. 15 to the histogram of FIG. 12;

FIG. 17 shows respectively adjacent areas resulting from partitioning the discrete values listed in FIG. 14;

FIG. 21 shows a two dimensional partitioning of the original histogram of FIG. 12 using the partitioning boundaries of FIG. 20 applied to the histogram of FIG. 18;

FIG. 22 shows the conversion of the partitioned histogram of FIG. 21 into a luminance look-up table illustrated;

FIG. 23 shows a tabulation of calculated centroid values into a palette color map;

FIG. 24 spatially associates each of the pixels of the image array with one of the numerical values of respective luminance-chrominance sub-regions of the histogram of FIG. 12;

DETAILED DESCRIPTION

Figure 1:
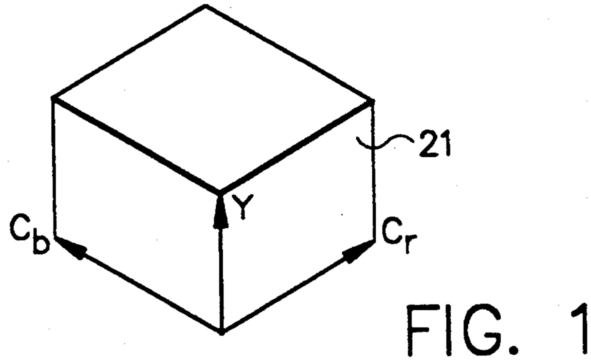
FIGS. 1–5 are a reduced complexity illustration of three dimensional axial splitting of a YCC (Y,Cr,Cb) color space along its respective axes into respective color space cells.

Before describing in detail the sequential scalar quantization mechanism in accordance with the present invention, it should be observed that the present invention resides primarily in what is effectively a prescribed digitized image transformation operator which may, but need not necessarily, be incorporated within the image processing software employed by a digital color image processing system. Consequently, the configuration of such a system and the manner in which it is interfaced with a digital image color source (e.g. a digitizing high precision (e.g. twenty-four bits per pixel) color imagery scanner) and a color image output device (e.g. eight bits per pixel color display) have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations and the image processing diagrams of the Figures are primarily intended to illustrate the major components of the system in a convenient functional grouping, and an example of the application of the image processing operators of the present invention to an illustrative example, whereby the present invention may be more readily understood.

Figure 6:
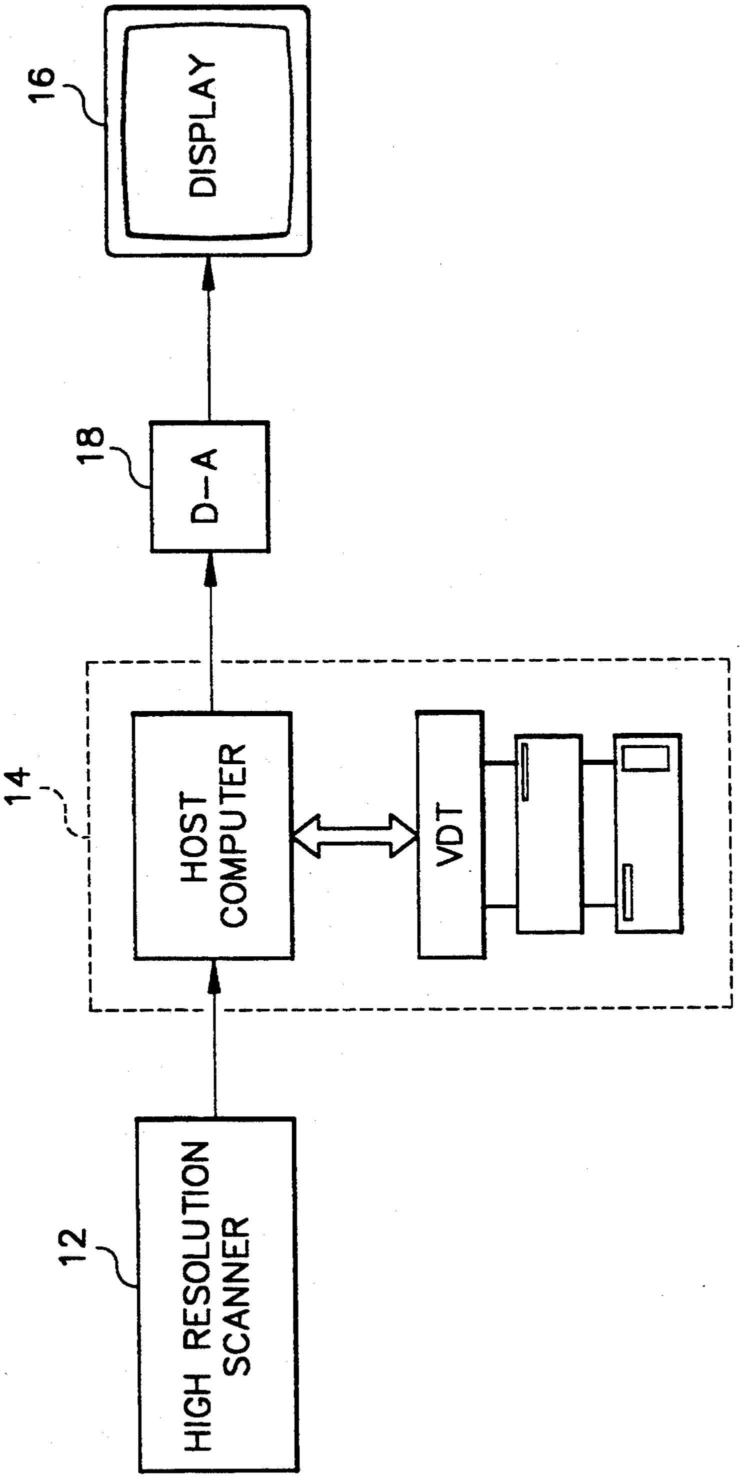
FIG. 6 diagrammatically illustrates an example of a color image processing system in which the quantization mechanism of the present invention may be employed.

A non-limitative example of a color image processing system, in which the sequential scalar quantization mechanism of the present invention may be employed, is diagrammatically illustrated in FIG. 6 as comprising a high color precision opto-electronic color image digitizing scanner 12, the output of which is coupled to a host digitized image processor (host computer) and attendant video display terminal (VDT) 14. Scanner 12 contains a sensor pixel array capable of generating output signals which, when converted into digital format, yield a 'digitized' color image file from which high a quality color output image may be obtained.

This digitally encoded data file, or 'digitized' color image, is supplied in the form of an imaging pixel array-representative bit map, resolved to a prescribed code width (e.g. eight bits per color per pixel), to host processor 14. Thus, for a three primary color (RGB) digitizing scanner, each pixel of its bit map output is encoded to twenty-four bits. Host processor 14 contains an image encoding and storage operator, through which each digitized color image file is stored, for retrieval of the digitized images for reproduction on a color image output device, such as an RGB color video display 16. A digital-to-analog converter unit 18 is associated with display 16 for driving the respective red, green and blue color guns of the display with analog video signals.

As pointed out previously, the capacity of the frame buffer employed with an output device, such as color display 16, may be typically on the order of eight bits per pixel, a code width which is considerably less than the twenty-four bits per pixel into which an original color image has been digitized by scanner 12. However, since each of three respective digital-to-analog converters of the digital-to-analog converter unit 18 that drives the RGB ports of display 16 has a resolution of eight bits, it is possible for color display 16 to replicate any of the colors within the original digital color image, as long as a code representative of that particular color is stored in the frame buffer. Consequently, it is necessary for host image processor 14 to incorporate a color conversion mechanism through which each color code of the digitized image output of scanner 12 (which may be any color within a total spectrum of $2^{24}=1.6\times10^{7}$ color codes available to define the original digital color image) is effectively transformed or mapped into one of a lesser number of output colors (e.g. $2^{8}=256$ colors) for driving output device 16.

In accordance with the present invention, the color conversion mechanism is operative to quantize a relatively high data precision digital color image, such as the twenty-four bit per pixel digitized color image output by digitizing scanner 12, into a limited number, or 'palette', of eight bit color codes that are to be stored within a limited capacity memory of the frame buffer associated with the output device for reproducing the original digital color image. Even though the frame buffer has a considerably reduced storage capacity (eight bits per pixel versus twenty-four bits per pixel output by scanner 12), the palette codes generated by the sequential scalar image quantizing mechanism of the invention are those that effectively minimize contouring artifacts in the reproduced image and provide an output image having a quality that is pleasing to the human visual system.

In its originally encoded output form a digitized color image (sixty-four pixels in the present example) output by scanner 12 of the system of FIG. 6 is an RGB image, with each respective color (red, green, blue) encoded to eight bits, for a total of twenty-four bits per pixel. Since the human visual system (HVS) attaches different importance to the luminance (Y) and chrominance (C) attributes of a color stimulus, the original digitized color image that has been encoded in terms of RGB coordinates is transformed into a luminance-chrominance (Y,Cr,Cb) space prior to quantization. The luminance-chrominance space employed is preferably related to a gamma-corrected RGB space of the output (display) device 16 by means of a linear transformation customarily employed in color image processing, as described for example in the text by A. Netravali entitled "Digital Pictures," Plenum Press, 1988.

In a practical embodiment of the color space transform operator, with each of the gamma-corrected R, G and B code values of the original digitized color image being encoded to an eight bit resolution (values 0–255), yielding a total encoding resolution of twenty-four bits per pixel, the color space transformation may be given by:

$$Y=0.29R+0.587G+0.114B$$

$$Cr=0.627(R--Y)+128$$

$$Cb=0.496(B-Y)+128,$$

where the Y coordinate of the transformed color space is associated with the gamma-corrected luminance component representing achromatic colors, the Cr coordinate is associated with the red-green color variation and the Cb coordinate is associated with the yellow-blue color variation.

Color Image Histogram Quantization Using Lambda Quantizer Function

As described briefly above, the sequential quantization mechanism of the present invention, referred to as sequential scalar quantization (SSQ), employs an asymptotically optimal quantizer density function, referred to as a Lambda function, that specifies the relative spacing of quantization levels along the respective axes of the color space, while minimizing mean squared error along the respective axis being split. Namely, the present invention, rather than operating directly upon the color space histogram itself, operates on Lambda probability density function of the histogram.

The general equation for the Lambda function which minimizes mean squared error along a respective variable axis of a distribution function of that variable is described, for example, in the text "Vector Quantization and Signal Compression," by A. Gersho et al, Kluwer Academic Press, 1991, and is set forth as follows in equation (1) as:

$$\lambda(x)=[p(x)^{\frac{1}{3}}]/[\int p(x)^{\frac{1}{3}}dx] \quad (1)$$

where p(x) is a probability density function which, in the present invention, corresponds to a digital color space histogram.

Although, in a strict mathematical sense, the Lambda function, being asymptotic, is premised upon the existence of a relatively large (increasing) number of output quantization levels and the expectancy that the probability distribution p(x) of the histogram variation along a respective color space axis is a relatively smooth function of the variable x, we have found that the Lambda function may be successfully employed with a discrete color space histogram for which a relatively small number of quantization levels (256) associated with an eight bit frame buffer of an color display device is to be produced.

Using the asymptotic Lambda function operator set forth above in equation (1) to specify the relative spacing of quantization levels in the neighborhood of x, a quantity NL(x)dx may be defined as the number of quantization levels along an arbitrary color space axis in the interval [x, x+dx]. Since, by definition, the function L(x) integrates to a value of 1, it can be seen that the respective splits along the x axis of the Lambda function are located at x values which demarcate areal segments under the Lambda curve, each areal segment being equal to the total area under the curve, namely the value 1, divided by N.

Figure 7:
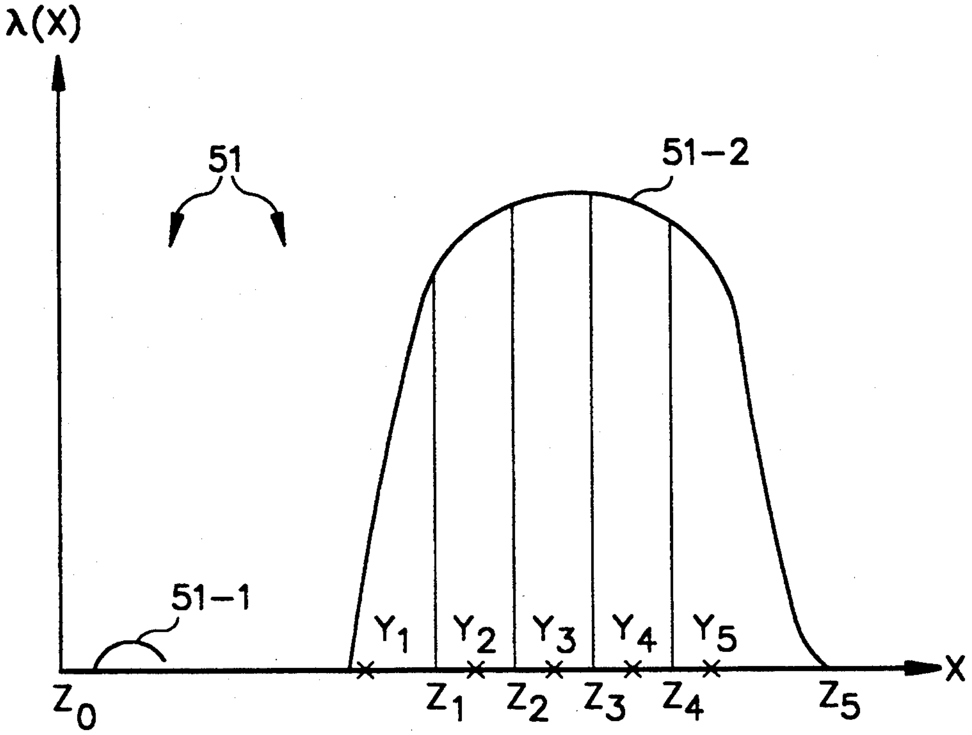
FIG. 7 diagrammatically illustrates a subdivision of an arbitrarily shaped Lambda function.

This subdivision of an arbitrarily shaped Lambda function is diagrammatically illustrated in FIG. 7 as a curve 51, having a relatively small variation with x 51-1 close to the L(x) axis and a principal variation portion 51-2, spaced apart from portion 51-1. In order to subdivide the Lambda function into segments or regions of equal area, where the number N of segments or regions equals five, for example, it is only necessary to proceed along the x axis, beginning at the origin, and successively calculate the area under the curves 51-1 and 51-2, to the termination of the variation of curve 51, denoted in FIG. 7 at $Z_5$. Split locations $Z_i$ at sequential locations along the x axis occur where the integrated value reaches an integral multiple of 1/N. In the illustrated example of FIG. 7, there are six sub-area boundaries $Z_0$–$Z_6$, with the sub-areas between any two sub-area boundaries $Z_i$ and $Z_{i+1}$ having the value of 1/N.

Also shown in FIG. 7 are locations $y_i$ which demarcate the projections of the centroids of the respective sub-areas on the x axis. For a color space histogram, each value $y_i$ represents a color code component of a respective quantized output cell along that particular axis.

Since a typical three dimensional color space (luminance/chrominance) histogram of a digital image is a distribution of discrete values, rather than a continuous function, the Lambda function of equation (1) is calculated as a summation of the discrete values. As in the case of the binary splitting mechanism described in our above-referenced co-pending application, quantization splits are initially conducted along the respective chrominance axes, followed by the luminance axis.

Figure 2:
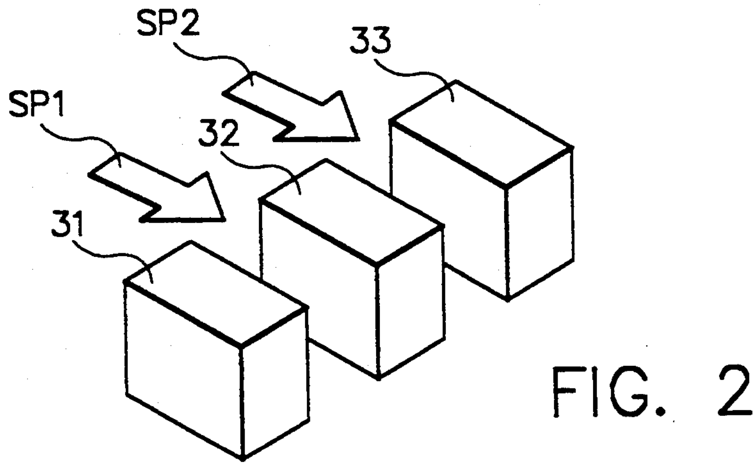
Figure 3:
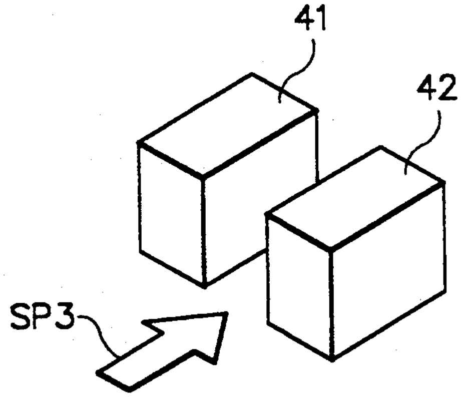

More particularly, the Lambda function of the (YCC) color space histogram along the first chrominance axis (either Cr or Cb) is quantized into some number of N1 levels. This operation partitions the three dimensional color space (Y,Cr,Cb) into N1 slices $B_{2j}$ (where $j=1 \ldots N1$), similar to those shown in the diagrammatic illustration of FIGS. 2 and 3.

Figure 4:
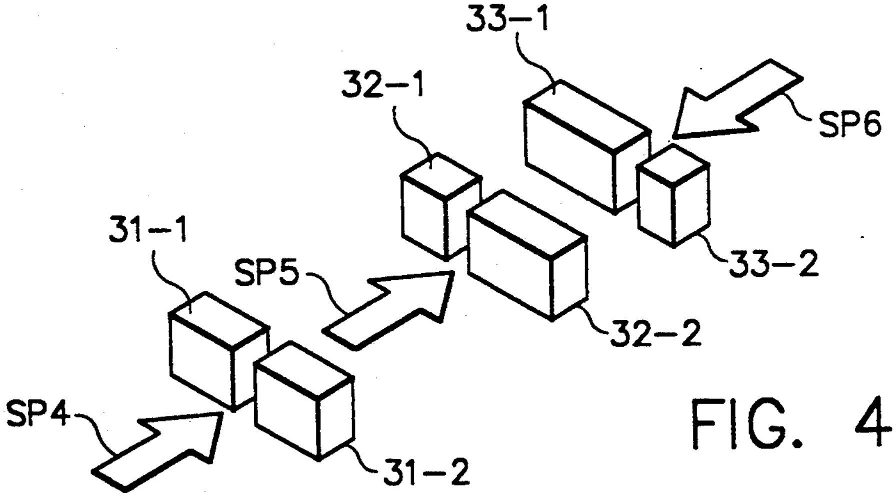

For $j=1 \ldots N1$, a respective jth slice $B_{2j}$ is then quantized along the second coordinate axis (either Cb or Cr) into $n_{2j}$ levels, so as to further partition the color space into N2 columns $B_{3j}$ that are parallel with the remaining yet to be quantized luminance coordinate axis Y, similar to those shown in the diagrammatic illustration of FIG. 4.

The number of levels $n_{2j}$ within the slices $B_{2j}$ satisfies the relationship, set forth below as equation (2)

$$\sum_{j=1}^{N_1} n_{2j} = N_2. \tag{2}$$

Figure 5:
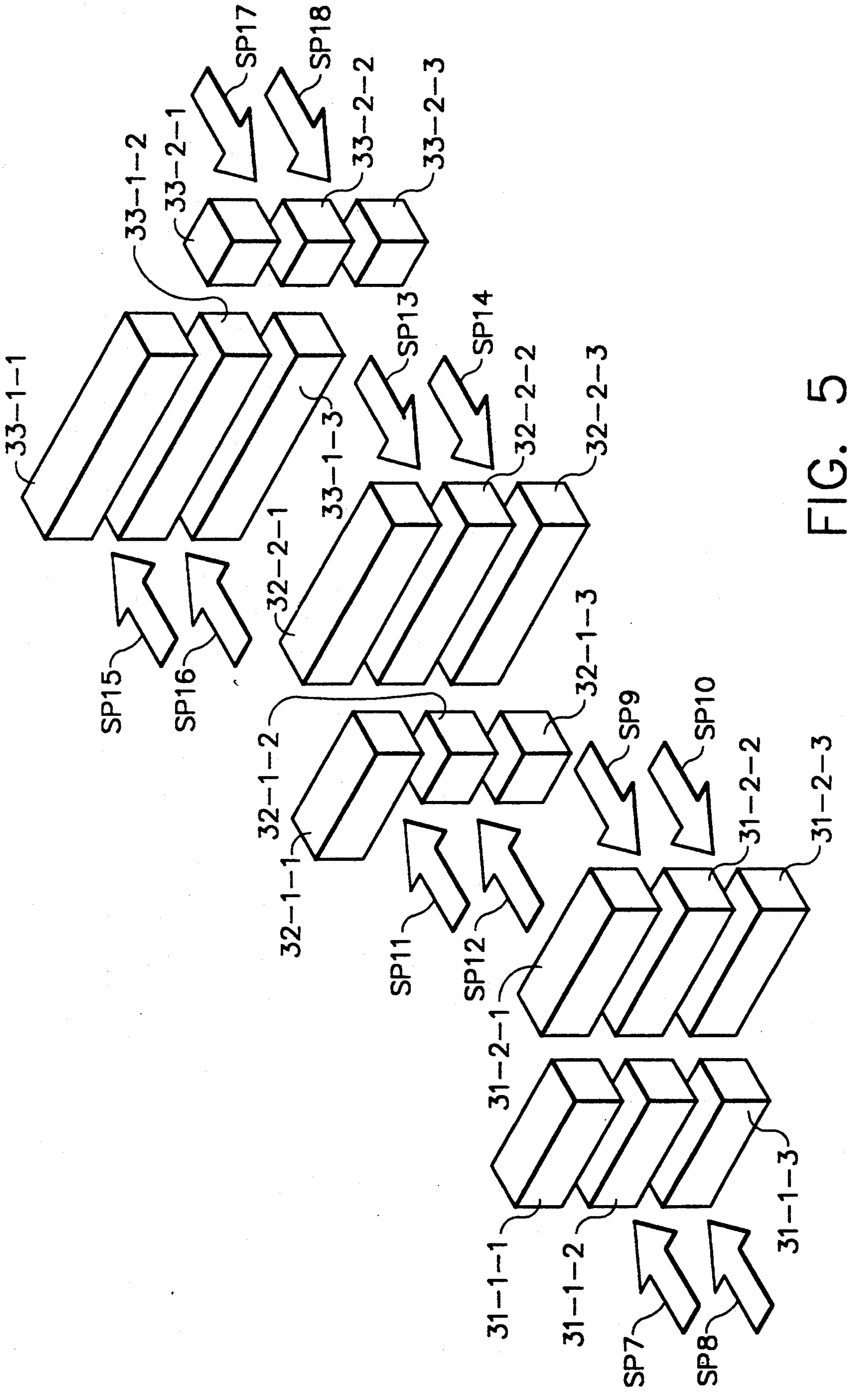

Finally, for $j=1 \ldots N2$, the respective jth columns $B_{3j}$ are quantized along the luminance axis Y into $n_{3j}$ levels, so as to partition the color space into N3 rectangular parallelpiped cells, similar to those shown in FIG. 5.

The number of levels $n_{3j}$ within the columns $B_{3j}$ satisfies the relationship set forth below as equation (3):

$$\sum_{j=1}^{N_2} n_{3j} = N_3; \tag{3}$$

Thus the total number N of output cells from which the color codes of the color palette are derived is equal to the number N3 of rectangular parallelpipeds resulting from the final quantization operation.

Order of Chrominance Axis Quantization Optimum Bit Allocation

To carry out the above quantization sequence, it is necessary to determine which chrominance axis (the Cr axis or the Cb axis) is to be quantized first. The choice of which chrominance axis is to be split first is based upon which order (of chrominance axis quantization levels or 'splits') yields the smaller total mean squared error. In order to determine mean square error, it is necessary to ascertain the optimum number of splits for each axis. For this purpose, initial empirical estimates are chosen for the numbers of splits N1 and N2 along the respective chrominance axes. Upon empirical observation of test images, we have found that for a total number of N=256 quantization levels, initial values of N1=18 and N2=30 appear to be reasonably good choices.

Using the empirical estimate for N1, the above described procedure for quantizing the Lambda function of the histogram along a first (e.g. Cr) chrominance axis is carried out. Again, it is to be noted that since the digital image's color space histogram is a distribution of discrete values, the integration terms in equation (1) are calculated as a discrete sum over the values in the histogram. Also, as described above with reference to FIG. 7, each of the color space (slice) boundaries along the first chrominance axis will have an area 1/N1, with a split location $Z_i$ occurring at each successive location along the selected (chrominance) axis where the integrated value reaches an integral multiple of 1/N1.

This demarcation of decision boundaries $Z_i$ may be mathematically expressed in accordance with equation (4) as:

$$\int_{z_{i-1}}^{z_i} \lambda_B(x)dx = 1/N1 \tag{4}$$

As further noted above with reference to FIG. 7, within each quantization cell resulting from the above step, an output quantization value $y_i$ is selected as the centroid of a respective cell. The value of $y_i$ may be defined in equation (5) as:

$$Y_i = \left[\int_{z_{i-1}}^{z_i} xp(x)dx\right] / \left[\int_{z_{i-1}}^{z_i} p(x)dx\right] \tag{5}$$

After performing the slice segmentation process along the first chrominance axis, the above described quantization procedure for quantizing the Lambda function of the histogram along the second (e.g. Cb) chrominance axis is carried out. In this step, each of the column boundaries along the second chrominance axis will occur at successive locations along the axis where the integrated value reaches an integral multiple of 1/N2, with a respective output quantization value $Y_i$ being selected as the centroid of a respective cell.

Estimation of Chrominance Axis Mean Squared Error

After quantizing along the two chrominance (Cr, Cb) axes, using empirical estimates for the number of splits for each respective axis, preliminary mean squared error values d1 and d2 for the respective chrominance axes processed in the order described above are calculated using differences between the output color code values obtained above and original color values of the digital image. Specifically, a first preliminary mean squared error value $d_i$, for each chrominance axis is defined in equation (6) as:

$$d_i = (1/3) \sum_{i=1}^{N} \sum_{x_j \in S_l} [x_{ij} - y_{il}]^2 \tag{6}$$

where i=1, 2, 3.

Calculation of Luminance Axis Mean Squared Error

A preliminary mean square error $d_3$ for the luminance axis is also calculated. Advantageously, the use of the Lambda function permits the error along the luminance axis to be estimated without having to actually quantize along the luminance axis. Specifically, a preliminary estimate of the error $d_3$ may be calculated in accordance with the expression:

$$d_3 = 1/3 \sum_{j=1}^{N} e_{3j}P(B_{3j}) \quad (7)$$

where $$e_{ij}=1/n_{ij}^2 \| p(x_i|B_{ij}) \|_{\frac{1}{3}} \quad (8)$$

$$\| p(x_i) \|_{\frac{1}{3}}=\{\int[p(x_i)]^{\frac{1}{3}}dx_i\}^3 \quad (9)$$

Calculation of Total Mean Squared Error

Given these three preliminary mean square error values $d_1$, $d_2$, $d_3$, a set of empirical constants $\alpha_e$, $\beta_e$, $_e$ to be employed in an expression for total mean squared error are calculated in accordance with the expressions:

$$\alpha_e=N_1^2d_1, \quad (10)$$

$$\beta_e=[(N_2^2)/(N_1^2)][d_2], \quad (11)$$

$$\eta_e=[(N)^2/(N_2)^2][d_3] \quad (12)$$

The values calculated for $\alpha_e$, $\beta_e$, $\eta_e$, using the empirical split numbers N1 and N2, and the calculated values of $d_1$, $d_2$, $d_3$ are next employed to determine an 'optimal' values $N1_{opt}$, $N2_{opt}$, in accordance with the expressions:

$$N_1=[N^{\frac{1}{3}}][(\alpha_e^2)^{1/6}/(\beta_e\eta_e)] \quad (13)$$

$$N_2=[N^{\frac{2}{3}}][(\alpha_e\beta_e)^{1/6}/\eta_e)^2] \quad (14)$$

The optimal values $N1_{opt}$ and $N2_{opt}$ and the values calculated for $\alpha_e$, $\beta_e$, $\eta_e$ are next used to calculate total mean squared error $D_3$ for the three dimensional color space in accordance with the expression:

$$D_3=(1/N_1^2)\alpha+(N_1^2/N_2^2)\beta+(N_2^2/N^2)\eta \quad (15)$$

In the above expression for total mean squared error $D_3$, each of the summed components corresponds to the mean square error along a respective one of the axes Cr, Cb and Y.

After calculating the total mean squared error $D_3$ for the three dimensional color space based upon the first selected chrominance axis order of quantization (e.g. Cr first, Cb second), the above process is repeated, with the chrominance axis order reversed (e.g. Cb first, Cr second). That chrominance axis order which yields the lower of the two total mean squared error values $D_3$ is then selected as the order to perform the complete quantization procedure (including the luminance axis Y).

The complete quantization procedure may now be conducted, using the chrominance axis order which has been determined to yield the lowest total mean squared error value and the previously calculated optimal numbers. During the complete quantization procedure, $N1_{opt}$ is used to define the number of slices that are split along the first chrominance axis. It is also used to determine the optimal number of quantization levels $n_{2j}$ within each slice $B_{2j}$, where $j=1 \ldots N1_{opt}$, when quantizing along the second coordinate axis (Cb or Cr). The optimal number $N2_{opt}$ is used to calculate the optimal number of quantization levels $n_{3j}$ within each slice $B_{3j}$, where $j=1 \ldots N2_{opt}$, when quantizing along the third coordinate axis Y.

The optimal quantization values $n_{ij}$ are calculated in accordance with the expression:

$$n_{ij} = [(N_i)(r_{ij})]/\left[\sum_{m=1}^{N_{i-1}} r_{im}\right] \quad (16)$$

$$r_{ij} = P(B_{ij})^{\frac{1}{3}} \int p(x_i|B_{ij})^{\frac{1}{3}}\, dx_i \quad (17)$$

Equation (16) yields real valued quantization levels $n_{ij}$, which satisfy the constraint of Equation (2). In practice, these quantities must be integers since they represent numbers of quantization levels. For each $j=1, \ldots, N_{i-1}$, $n_{ij}$ is replaced in Equation (16) by its nearest integer. In doing so, however, it is possible that the constraint of Equation (2) be violated. More particularly, suppose that the sum of the quantization levels $n_{ij}$ is greater than $N_i$. The value of one or more of the quantization levels $n_{ij}$ must be decreased until Equation (2) is satisfied. Since a reduction in the number of quantization levels $n_{ij}$ in region $B_{ij}$ will increase MSE along axis $x_i$ in that region, $n_{ij}$ must be altered in a manner such that the overall error increases minimally. Asymptotic theory is employed to predict MSE $e_{ij}$ in $B_{ij}$ by the expression:

$$e_{ij}=[1/n^2_{ij}][\| p(x_i/B_{ij}) \|_{\frac{1}{3}}] \quad (18)$$

The value of MSE $e_{ij}$ must be multiplied by $P(B_{ij})$ in order to obtain the contribution of the error in $B_{ij}$ to the overall MSE along $x_i$. The increase in MSE or the cost $\delta_{ij}$ resulting from decrementing $n_{ij}$ by a value of 1 is then given by the expression:

$$\delta_{ij}=[1/(n_{ij}-1)^2-1/n_{ij}^2][\| p(x_i/B_{ij}) \|_{\frac{1}{3}}p(B_{ij})] \quad (19)$$

Starting with the region with the smallest $\delta_{ij}$ and proceeding through the regions $B_{ij}$ in order of increasing cost, decrement $n_{ij}$ until (2b) is satisfied. (Regions with $n_{ij}=1$ are left unaffected.)

Conversely, suppose that the sum of the integers $n_{ij}$ is smaller than $N_i$. In this case, a decrease in MSE or the gain $\delta_{ij}$ resulting from incrementing $n_{ij}$ by a value of 1 is obtained as $$\delta_{ij}=[1/n_{ij}^2-1/(n_{ij}+1)^2][\| p(x_i/B_{ij} \|_{\frac{1}{3}}p(B_{ij})] \quad (19A)$$

The process now proceed through the regions in order of decreasing $\delta_{ij}$ and increments each $n_{ij}$ by a value of 1 until Equation (2) is satisfied.

Once the above-described three dimensional quantization of the Lambda quantizer density function of the histogram of the digital color image of interest has been completed, actual chrominance and luminance values used to define each color code of the (256 component) palette are the Cr, Cb and Y coordinates of the centroids of the respective quantization cells of the partitioned color space, the centroid values being tabulated in a palette color map. In order to map the palette values tabulated in the palette color map into the image array, an output image map is created. The output map spatially associates each of the pixels of the image array with one of the numerical values of the respective YCC cells of the histogram. A video memory in which palette color labels are stored may be coupled to a look-up table, which generates RGB values associated with the palette color labels. The RGB outputs of the look-up table are then applied to respective D-A converters associated with the RGB ports of an image output device, so that an output image displayed thereby will faithfully replicate the color content of the original digital image, even though the number of color codes stored in the attendant frame buffer is considerably less than the number of color codes capable of being specified by the encoding resolution of the digital image.

Post Quantization Corrective Partition-Splitting

In the foregoing description of the use of the Lambda function operator to sequentially quantize a digital color image (YCC) histogram, it was assumed that the total number N of quantization levels or cells into which the color space distribution has been sequentially quantized along its Cr, Cb and Y axes corresponds to the full encoding resolution of the frame buffer (e.g. eight bits, so that N=256 colors). While setting N equal to the full available capacity of the frame buffer might be acceptable if all image histograms were continuous, relatively slowly varying distributions, in reality, it can be expected that the quantizer density function of an image histogram may be discontinuous, such as the one dimensional distribution illustrated in FIG. 7, described above.

Namely, the distribution depicted in FIG. 7 has a region 51-1 that contains a relatively small variation with x, close to the L(x) axis and a principal, considerably larger variation region 51-2, spaced apart from portion 51-1. Because partitioning of the Lambda function into N segments or regions of equal area involves subdividing the area under the entire function without regard to variation of its distribution, then, for the present example of N=5 partitions, what results from a partitioning of the Lambda function of FIG. 7 is five areas demarcated by boundaries $Z_0 \ldots Z_5$ having centroid projections at locations $Y_1 \ldots Y_5$ along the x axis. Because the location of centroid (output color) $y_1$ of the area contained within boundary lines $Z_0$ and $Z_1$ is displaced along the x axis a substantial distance from region 51-1, the contents of region 51-1 are not accurately represented by color value $y_1$, which will cause isolated spots in the output image to have visually perceptible color errors.

In accordance with the present invention, this potential problem is obviated by using less than the full encoding resolution of the frame buffer to perform initial quantization of the color space distribution along its Cr, Cb and Y axes, thereby reserving a portion of the capacity of the frame buffer for post quantization adjustment, and then performing corrective partitioning of regions observed to contain substantial variations between their associated output color code values and input color values of the original color space distribution. As a non-limitative example, five percent of the capacity of the frame buffer may be reserved for corrective partitioning, so that the original size of the output color code palette has N' colors, where N'=0.95N. Corrective partitioning of an area where post correction is to be effected is performed by locating an additional split along the x axis at a point midway of the data in the region. Thus, for the example illustrated in FIG. 7, an additional split of region 51-1 is located at a point midway of the data within the area under the curve demarcated by boundary lines $Z_0$ and $Z_1$. The result is shown in FIG. 8.

Figure 8:
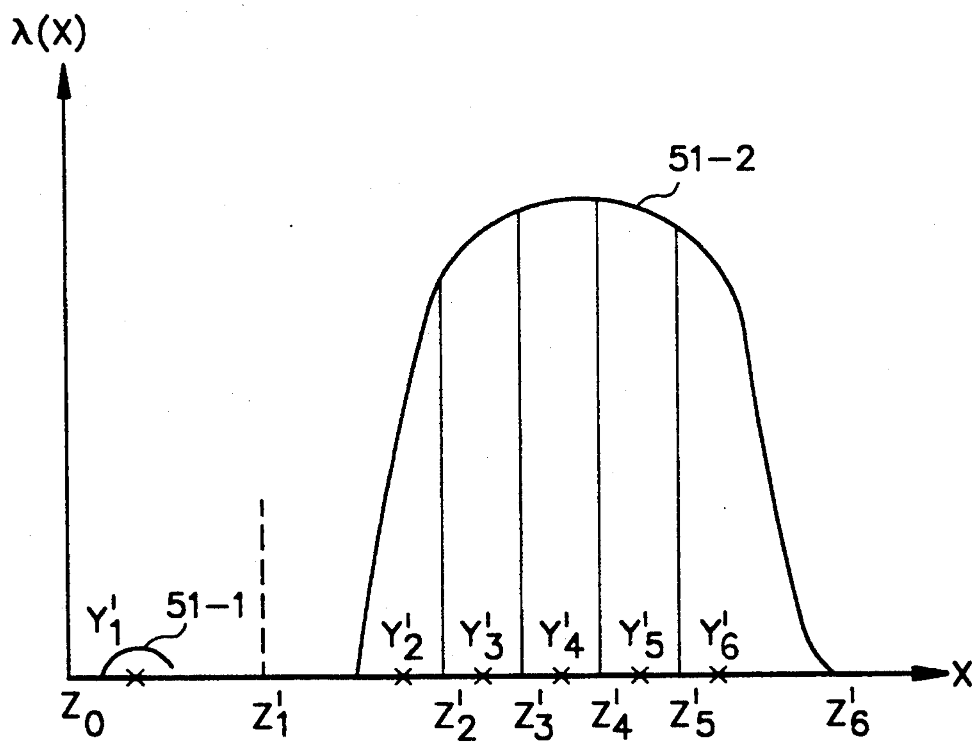
FIG. 8 illustrates the partitioning of the Lambda function distribution of FIG. 7 into a pair of subregions.

In FIG. 8 it can be seen than the distribution of FIG. 7 has been further partitioned at location $Z'_1$ into a pair of sub-regions, so that the total Lambda function is now partitioned into N'+1 segments demarcated by boundaries $Z_0, Z'_1 \ldots Z_6$, having respective centroid projections at locations $y'_1, y'_2 \ldots y'_6$ along the x axis. Because the location of centroid (output color) $y'_1$ of the area contained with boundary lines $Z_0$ and $Z'_1$ is located within region 51-1, the contents of region 51-1 are now accurately represented by color value $y'_1$, which effectively corrects for what would otherwise be visually perceptible isolated color errors in the output image produced by the centroid values of FIG. 7.

Visually Weighting of Mean Square Error

As noted earlier, in general, the human visual system is more sensitive to luminance variations than to chrominance variations, particularly in the case of color quantization, where the most visible artifact is customarily contouring effects in luminance. To account for this sensitivity differential, the luminance value of mean square error is weighted to be K times more significant than mean squared error along the chrominance axes of the color space.

Namely, in the above equation (15) for total mean squared error $D_3$ for the three dimensional color space, the third term $$(N_2^2/N^2)^\eta \quad (20)$$

corresponding to the value of mean squared error $d_3$ along the luminance (Y) axis is multiplied by a weighting factor K. This means that the optimal quantization values N1 and N2 for the respective chrominance axes for weighted mean square error are calculated as follows:

$$D_3^w = d_1 + d_2 + Kd_3 \quad (21)$$

$$N_1 = (N^{\frac{1}{3}}/K^{1/6})(\alpha^2/\beta\eta)^{1/6} \quad (22)$$

$$N_2 = (N^{\frac{2}{3}}/K^{\frac{1}{3}})(\alpha\beta/\eta 2)^{1/6} \quad (23)$$

It can be seen that the larger the value of the luminance weighting factor K, the smaller the number of quantization levels N1 and N2 for the respective chrominance axes. Based upon experimental investigation, it has been found that a value of K=4 satisfactorily reduces objectionable luminance contouring artifacts.

Use of Spatial Activity Measure During Luminance Quantizaton

In addition to taking into account the increased sensitivity of the human visual system for errors in luminance than in chrominance, the above-described Lambda quantization process may also be enhanced to accommodate for the increased sensitivity of the human visual system to quantization errors in relatively smooth (low spatial activity) rather than 'busy' (high spatial activity) regions of the image.

For this purpose, the original digital image is subdivided into blocks of pixels (e.g. blocks of eight rows by eight columns of pixels, totalling sixty-four pixels per block). At each pixel location (m,n) within each block 1 of the image, a gradient measure of the variation of luminance Y is defined as:

$$|\nabla_{mn}| = |Y_{m,n} - Y_{m,n-1}| + |Y_{m,n} - Y_{m-1,n}|, \quad (24)$$

An average $\alpha_L$ of the luminance gradient values of the block 1 is then computed. Using this average value $\alpha_L$, a block weighting value $w_L$ that is inversely related to the spatial activity within block 1 is then computed as:

$$\omega_1 = 1/(min\{\alpha_1, 20\}+2)^2 \quad (25)$$

The above equation (22) for $w_L$ effectively limits the dynamic range of the activity measure to lie between a value of 2 (corresponding to flat or no spatial activity regions) and a value of 22 (corresponding to an edge or high spatial activity) regions.

For each color $c_i$ within the histogram, a subjective weight $w_{ci}$ is assigned as the average of the block weights $w_L$ for each block in which the color $c_i$ appears. Then, during the quantization of respective columns $B_{3j}$ of the Lambda function along the luminance axis Y, the number of levels $n_{3j}$ to be assigned to a respective column is determined by modifying the factors $r_{3j}$ in equation (16) in accordance with the expression:

$$r'_{3j} = \omega'_j r_{3j} \quad (26)$$

where $w'_j$ is the average of the subjective weights $w_{ci}$ of all colors $c_i$ in the column $B_{3j}$. If a particular cell $B_{3j}$ contains colors from mainly smooth spatial areas of the image, it will have a larger weight $w'_j$ and therefore a larger associated quantization allocation $n_{3j}$. It will be appreciated therefore that more quantization levels are assigned to colors located in smoothly varying image regions.

Image Independent Color Palette Design for Error Diffusion

As described above, even though the Lambda quantizer density function is customarily premised upon the existence of a relatively large number of output quantization levels, we have been able to successfully employ it to perform sequential scalar quantization of a discrete color space histogram into a relatively small number of quantization levels (e.g. on the order of 256 levels associated with an eight bit frame buffer of an color display device). Advantageously, because sequential scalar quantization can be efficiently implemented by means of a set of cascaded, relatively small code width look-up tables, the computational intensity of the quantization process is considerably decreased.

To make optimum use of a color palette obtained in accordance with the present invention, it is desirable that the color palette be image-independent, which makes it possible to process multiple images using the same color palette for simultaneous display. Unfortunately, the image quality obtained from an image independent color palette is lower than that obtained from an image-dependent color palette.

Pursuant to a further aspect of the present invention, using the above described Lambda processor, we have developed a mechanism to obtain an image-independent color palette, which is optimally distributed in a visually uniform (L,a,b) color space, and which is employed in conjunction with an error diffusion technique, to distribute errors at higher frequencies and thereby reduce human visual sensitivity to those errors. Although error diffusion is customarily conducted in the (L,a,b) color space, by proper choice of YCC color space, the use of YCC/Lab transform operators becomes unnecessary, thereby reducing computational intensity. For a non-limitative example of a description of error diffusion image processing, which exploits the lowpass characteristics of the frequency response of the human visual system, attention may be directed to an article by R. W. Floyd et al, entitled: "An Adaptive Algorithm for Spatial Greyscale," Proc. SID, Vol. 17, No. 2, pp. 75–77, 1976.

Color Distribution

In accordance with a first step in the design of the optimum image-independent color palette, the image-dependent color space histogram is replaced with a universal color distribution. As noted above, the output color palette is to be generated in terms of the L,a,b color space, since the human visual sensitivity to color changes is approximately uniform in L,a,b space. This universal distribution is obtained by assuming that the image colors are uniformly distributed in the L,a,b space over the operational gamut of the display device. In particular, the function w(L,a,b) may be defined as:

w(L,a,b)=1, if (L,a,b) falls within the gamut of the display device; and 0, if (L,a,b) falls outside the gamut of the display device.

The probability distribution p(L,a,b) which is used in place of the image-dependent histogram and is employed for the image colors becomes:

$$p(L,a,b) = [w(L,a,b]/[\int w(L,a,b)dLdadb] \quad (27)$$

Color Palette Design

To create a color palette that is visually pleasing, the image-dependent sequential scalar quantization mechanism, described previously, is modified with respect to the manner in which the one-dimensional quantization levels are computed, and the order of quantization is always fixed with the color space being quantized along the L-axis first, a-axis second, and b-axis third.

Computation of the one dimensional quantization level involves allocating a number of n quantization levels $q_1, \ldots q_n$ along axis x, using the marginal histogram distribution p(x) as defined in equation (1), supra. Since the image-independent quantizer is to be used in conjunction with error diffusion, it is important that the quantization levels span the complete range of colors. Consequently, the quantization levels are selected with the constraint that the first last quantization levels span the minimum and maximum possible colors of the distribution. Namely, the first quantization level $q_1$ is defined as:

$$q_1 = \min|_x\{x:p(x) = /0\}, \text{ and}$$

$$q_n = \max|_x\{x:p(x) = /0\}.$$

The remaining quantization levels $q_2 \ldots q_{n-1}$ are selected such that $$1/(m-1) = \int_{qi}^{qi+1} \lambda(x)dx \quad (28)$$

After the image quantization levels are selected and the color space is partitioned along axis x, into n segments or sets, new quantization levels are defined as $q'_1, \ldots, q'_n$ such that $q'_i$ are located at the centroids of their respective partitioned regions.

In particular, letting $z_i$ be the decision boundary between $q_i$ and $q_{i+1}$, then $z_i$ may be defined as:

$$z_i=(\tfrac{1}{2})(q_{i+1}+q_i). \tag{29}$$

Defining $z_0$ to be an infinitely negative value and $z_n$ to be an infinitely positive value, then:

$$q_i' = \left[\int_{zi-1}^{zi} xp(x)dx\right] / \left[\int_{zi-1}^{zi} p(x)dx\right] \tag{30}$$

The values of $q'_i$ are then used as output colors since, they are guaranteed to fall within the output color gamut.

Error Diffusion

While error diffusion may be performed in a color coordinate system which is linearly related to the RGB components, improved performance has been realized by employing a new opponent color space and processing the chrominance components (Cr, Cb) differently than the luminance (Y) components. For the present application, a new opponent color space which results in a computationally efficient implementation of the sequential scalar quantizer is employed.

More particularly, $Y_yC_xC_z$ coordinates are defined by:

$$Y_y=116(Y/Y_n)-16,$$

$$C_x=500[(X/X_n)-(Y/Y_n)], \text{ and}$$

$$C_z=200[(Y/Y_n)-(Z/Z_n)],$$

where $X_n$, $Y_n$ and $Z_n$ are the XYZ color coordinates of the white point. (In the present example, the standard D65 white point is employed.) The $Y_yC_xC_z$ coordinates are closely related to the (L,a,b) coordinates by the expressions:

$$L=116f(Y/Y_n)-16,$$

$$a=500[f(X/X_n)-f(Y/Y_n)], \text{ and}$$

$$b=200[f(Y/Y_n)-f(Z/Z_n)],$$

where $f(x)=x^{\frac{1}{3}}$ if $0.008856<x$, and x is less than or equal to 1; and $f(x)=7.787x=(16/116)$, if x is greater than or equal to 0 and x is less than or equal to 0.008856.

The sequential scalar quantizer is specified in L,a,b coordinates so that it is visually uniform. However, the error diffusion mechanism processes imagery data in $Y_yC_xC_z$ (YCC) coordinates. One approach to solve this problem would be to transform the input pixels from YCC color space to Lab color space and then quantized the transformed pixels, as shown by the image signal processing flow diagram of FIG. 9, wherein an input image is applied to a color palette that has been visually optimized by the Lambda density quantizer function described above.

Figures 9, 10:
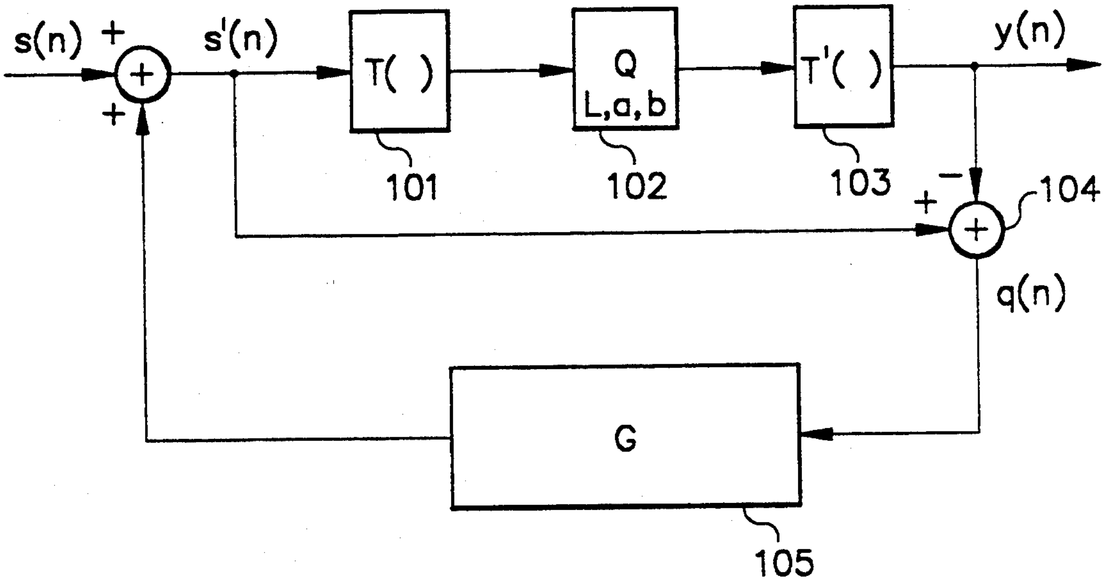
FIG. 9 is an image signal processing flow diagram of error diffusion applied to a color palette that has been visually optimized by the Lambda density quantizer function.
FIG. 10 diagrammatically illustrates encoded chrominance values for the Cr component of a RGB-Y,Cb,Cr transformed image associated with each of the pixels of a sixty-four pixel image array.

More particularly, in FIG. 9, the quantizer operates on input values s(n) which are transformed at T() operator 101 from YCC space into Lab space. The Lab vector of the input pixel vector is quantized at 102 by the Lambda quantizing mechanism described above, and then retransformed at 103 back into Y'C'C' space by an inverse color space transform operator T'() for error diffusion.

The resulting output vector y(n) is subtracted at 104 from a corrected input vector s'(n), to produce a quantization error vector q(n). Quantization error vector q(n) is then filtered through an error diffusion filter 105 and summed at 106 with incoming pixel vector values s(n). Error diffusion filter 105 preferably employs a filter function based upon a human visual model, such as that described in an article by B. W. Kolpatzik et al, entitled: "Optimized Error Diffusion for Image Display," Journal of Electronic Imaging, Vol 1, No. 3, pp. 277–292, 1992.

Because employing a color space transformation adds computational complexity to the error diffusion mechanism, it is preferable to apply the sequential scalar quantizer directly to the YCC components.

For this purpose, since the function f( ) is a monotonically increasing function, quantization of $L=116f(Y/Y_n)-16$ may be replaced by an equivalent quantization of $Y_y$, as $Q_L[L]=Q_y[Y]$.

The second component 'a' is dependent upon the value of $Y_y$ and $C_x$. However, the value of $Y_y$ may be replaced with the quantized value $Q_y[Y_y]$. Quantization of 'a' is then equivalent to quantization of $C_x$.

More particularly, the function 'a' may be defined as:

$$\text{'}a\text{'} = g(C_x, Y_y). \text{ Therefore,} \tag{31}$$

$$\begin{aligned} Q_a[a] &= Q_a[g(C_x, Y_y)], \text{which is approximately equal to:} \\ &= Q_a[g(C_x, Q_y[Y_y])], \\ &= Q_{Cx}[C_x, Q_y[Y_y]], \end{aligned}$$

which indicates that the quantizer for 'a' can be replaced by a quantizer for $C_x$ for each quantized value $Q_y[Y_y]$.

Computation of the third component 'b' is similarly computed by defining the function 'b' as:

$$\text{'}b\text{'} = h(C_z, Y_y). \text{ Therefore,} \tag{32}$$

$$\begin{aligned} Q_b[b] &= Q_b[h(C_z, Y_y)], \text{which is approximately equal to:} \\ &= Q_b[h(C_z, Q_y[Y_y])], \\ &= Q_{Cz}[C_z, Q_y[Y_y]], \end{aligned}$$

which indicates that the quantizer for 'b' can be replaced by a quantizer for $C_z$ for each quantized value $Q_y[Y_y]$.

Thus, error diffusion using the sequential scalar quantizer of the present invention may be performed without the need for any color space transform, by employing the $Y_yC_xC_z$ opponent color space.

In order to realize such an XYZ color space from the original RGB components, a relatively straightforward transform matrix may be employed:

The SMPTE (R,G,B) coordinate system with D65 white point correction is related to the (X,Y,Z) coordinate system by the following transformation.

$$\begin{bmatrix} X \\ Y \\ Z \end{bmatrix} = \begin{bmatrix} 0.3935 & 0.3653 & 0.1917 \\ 0.2124 & 0.7011 & 0.0866 \\ 0.0187 & 0.1119 & 0.9584 \end{bmatrix} \begin{bmatrix} R \\ G \\ B \end{bmatrix} \tag{33}$$

EXAMPLE (FIGS. 10–24)

In the description to follow, an exemplary illustration of the application of the Lambda quantizer density function will be presented for the case of a reduced spatial complexity digital color image, specifically a sixty-four pixel image comprised of an array of eight rows and eight columns of pixels. The resolution to which each coordinate is encoded will be four bits (rather than the customary eight bits), in order to simplify computation. It should be understood, however, that such a reduced spatial complexity image and data resolution are merely for purposes of example and are not to be considered limitative of images which may be processed in accordance with the present invention. In addition, in order to simplify the drawings, the application of the steps of the invention to a non-limitative example of a set of image parameters, to be described, is illustrated in terms of two dimensions of a luminance, chrominance (Y,Cb,CR) color space, specifically with respect to a single chrominance coordinate (Cr) and the luminance coordinate (Y). Although, the other chrominance coordinate (Cb) is not shown, the manner in which the splitting mechanism of the invention is applied to this additional axis is described, so that a full appreciation of the present invention may be obtained without unduly complicating the drawings.

In its originally encoded output form a digitized color image (sixty-four pixels in the present example) output by scanner 12 of the system of FIG. 6 is an RGB image, with each respective color (red, green, blue) encoded to eight bits, for a total of twenty-four bits per pixel. As noted earlier, since the human visual system (HVS) attaches different importance to the luminance (Y) and chrominance (C) attributes of a color stimulus, the original digitized color image encoded in RGB coordinates is transformed into a luminance-chrominance (Y,Cr,Cb) space for quantization, as described previously.

In the present example, in order to reduce the complexity of the drawings and their attendant description, the invention will be described in terms of a two-dimensional (rather than a three-dimensional) color space embodiment, in particular a Y-Cr color space (rather than a Y-CR-Cb color space). Although the manner in which the other (Cb) color component is partitioned is described above, it is not shown in the present example, since the two dimensional Y-Cr color space lies in the plane of the drawings, so that the Cb axis extends normal to the plane of the drawings and thereby off the paper toward the reader.

Referring now to FIG. 10, encoded chrominance values for the Cr component of the RGB-Y,Cb,Cr transformed image associated with each of the pixels of a sixty-four pixel image array are diagrammatically illustrated as an eight-by-eight matrix along respective x and y axes. Similarly, FIG. 11 diagrammatically illustrates an eight-by-eight matrix of encoded luminance (Y) values of the Y,Cb,Cr-transformed image associated with each of the pixels of the 8×8 array. (A like 8×8 matrix of encoded chrominance values for the Cb component of the RGB-Y,Cb,Cr transformed image associated with each of the pixels of a sixty-four pixel image array is also formed. However, as noted above, in order to simplify the complexity of the drawings, this additional matrix is not shown.)

Also, in the spatial matrices of Cr and Y values of FIGS. 10 and 11, respectively, in order to reduce numerical complexity, each pixel of each eight-by-eight array has been resolved to four bits (encompassing sixteen data values 0–15). The x and y axes of FIGS. 10 and 11 are the respective spatial axes of the pixel matrix into which a color image has been digitized. In effect, therefore, the spatial matrices of FIGS. 10 and 11 are respective chrominance (Cr) and luminance (Y) images derived from a transform of the original RGB image into Y,Cr,Cb color space.

Generate Histogram (FIG. 12)

FIG. 12 is a two-dimensional histogram of the luminance (Y) and chrominance (Cr) representative codes of the digitized image of FIGS. 10 and 11, having an abscissa or Cr axis that has been subjected to one bit prequantization to provide successive pairs of Cr values, and an ordinate or Y axis denoted in successive luminance (Y) values. By definition, the histogram of FIG. 12 is a probability density function of discrete pixel values, representative of the density distribution of luminance values with respect to chrominance values along the Cr axis. The objective of the Lambda density function quantization mechanism employed in accordance with the respective steps of the present invention described previously is to partition or subdivide the histogram along each of the respective Cr and Y axes of the color space into a plurality of sub-regions or cells, with each resulting cell being associated with or representative of a respective color code of an output color code palette.

Generate Marginal Histogram (FIG. 13)

For purposes of reduced numerical complexity, the luminance (Y) values tabulated in each of the respective (Cr) columns of the histogram of FIG. 12 may be normalized with respect to the number of pixels (8×8=64 pixels/array) in the image, so as to produce a marginal histogram shown in FIG. 13.

As described above, the first step in the sequential scalar quantization mechanism of the present invention is to generate an asymptotically optimal probability density (Lambda) function of the histogram. Since the histogram of the present example is a probability density function of luminance with respect to chrominance or p(Cr), rewriting equation (1) in terms of Cr yields:

$$\lambda(C_r) = [p(C_r)^{\frac{1}{3}}] / \left[ \sum_{C_r} (C_r)^{\frac{1}{3}} \right] \quad (34)$$

Generate Lambda Function Distribution (FIG. 14)

Applying the tabulated histogram values listed in the marginal histogram of FIG. 13 produces a Lambda function distribution in terms of Cr as shown in FIG. 14. Since, in the simplified two-dimensional histogram of the present example, there is only a single chrominance axis (here: Cr), the above-described technique of determining which chrominance axis (the Cr axis or the Cb axis) is to be quantized first is dispensed with. However, it is still necessary to optimize the number of splits (here=N1) along the Cr axis.

Preliminary Quantization to Optimize N1 (FIG. 15–16)

For this purpose, let N1=3 as an arbitrary choice. The tabulated values produced by the Lambda function of the marginal histogram, shown in FIG. 14, is therefore divided into (N1=3) intervals, such that the area within each interval of the Lambda function set forth in equation (34) above is equal to ⅓.

Partitioning the discrete values listed in FIG. 14 yields respectively adjacent areas shown in FIG. 15. It should be observed that the values of the respective areas are not exactly equal to 0.333 because the image array of the present example is extremely small (only sixty-four pixels) and there are so few levels. Again, it is to be recalled that the purpose of the numerical example is simply to illustrate how the steps of the invention described previously are applied to a digital image.

Applying, the partitioning boundaries of FIG. 15 to the histogram of FIG. 12 produces the partitioned Y-Cr space of FIG. 16, which shows the luminance variation along the Cr axis partitioned into respective columns $B_{21}$, $B_{22}$, $B_{23}$.

The mean squared error (MSE) $d_1$ along Cr is defined by:

$$MSE \text{ along } C_r = d1 = \sum_{j=1}^{3} \sum_{C_r \epsilon B_{2j}} (C_r - C_{rj})^2 p(C_r) \quad (35)$$

where $C_{rj}$=centroid of $C_r$ in $B_{2j}$ and yields a value of $d_1=1.8952$.

Next, computing $n_{2j}$ in accordance with equation (16), where j is no less than one, nor greater than three, respective values $n_{21}$, $n_{22}$, $n_{23}$ are calculated to be:

$n_{21}=1.875$,
$n_{22}=2.245$,
$n_{23}=3.88$.

Converting these values to integers, $n_{21}=2$
$n_{22}=2$
$n_{23}=4$.

The mean square error along the luminance axis (Y) is next determined using equation (8) to obtain $e_{2j}$, j=1,2,3 and equation (7) to obtain $d_2$. Namely, $$e_{2j} = (1/12n^2{}_{2j}) \| p(Y|B_{2j}) \|_{\frac{1}{3}} \quad (36)$$

$$d_2 = \sum_{j=1}^{3} (e_{2j} p(B_{2j})) \quad (37)$$

which yields $d_2$ approximately equal to 0.9387.

For the empirical values of N1=3 and N=8, $\alpha$ and $\beta$ are calculated in accordance with equation (15), set forth above. Namely, $\alpha=N_1^2 d_1=3\times3\times1.8952=17.0568$, and
$\beta=(N_2^2/N_1^2)d_2=(64/9)\times0.9387=6.6754$.

Therefore, from equation (13), $N_1=(\alpha/\beta)^{\frac{1}{4}}(N_2)^{\frac{1}{2}}$, *so that* $N1$ is equal to 4 (nearest integer), rather than its originally chosen empirical value of $N_1=3$.

Having optimized the value for N1=4, the complete quantization process is now carried out. Specifically, the tabulated values produced by the Lambda function of the marginal histogram, shown in FIG. 14, is divided into (N1=4) intervals, such that the area within each interval of the Lambda function is equal to ¼.

Final Quantization (FIGS. 17–21)

Partitioning the discrete values listed in FIG. 14 yields respectively adjacent areas shown in FIG. 17. Again, it is to be observed that the values of the (four) respective areas are not exactly equal to 0.250 because the image array of the present example is extremely small (sixty-four pixels) and there are so few levels. Applying, the partitioning boundaries of FIG. 17 to the histogram of FIG. 12 produces the partitioned Y-Cr space of FIG. 18, which shows the luminance variation along the Cr axis partitioned into respective columns $B_{21}$, $B_{22}$, $B_{23}$, $B_{24}$.

Figures 18, 19:
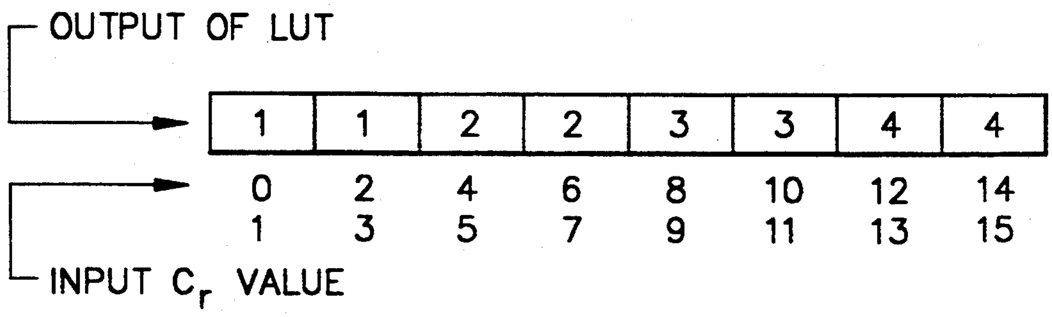
FIG. 18 shows the luminance variation along the Cr axis partitioned into respective columns $B_{21}$, $B_{22}$, $B_{23}$, $B_{24}$, resulting from applying the partitioning boundaries of FIG. 17 to the histogram of FIG. 12.
FIG. 19 is (two-bit) look-up table (for Cr) generated from partitioning diagram of FIG. 18.

Generate Chrominance Look-Up Table (FIG. 19)

From the partitioning diagram of FIG. 18, a first (two-bit) look-up table (for Cr) may be generated as shown in FIG. 19. Namely, for the present two-dimensional color space example, since any color code value within the color palette must fall into one of the four chrominance regions of FIG. 18 (i.e. $B_{21}$, $B_{22}$, $B_{23}$, $B_{24}$) two bits are required to quantize the chrominance component.

Next, $n_{2j}$ is computed in accordance with equation (16), where j is no less than one, nor greater than four, respective values $n_{21}$, $n_{22}$, $n_{23}$, $n_{24}$ are calculated to be: $n_{21}=n_{22}=n_{23}=n_{24}=2$.

Then, for each column $B_{2j}$, the Lambda function is calculated in terms of $B_{2j}$ as:

$$\lambda(Y|B_{2j}) = (p(Y|B_{2j})^{\frac{1}{3}}) / \sum_{(Y \epsilon B_{2j})} (p(Y|B_{2j})^{\frac{1}{3}}) \quad (38)$$

Figure 20A:
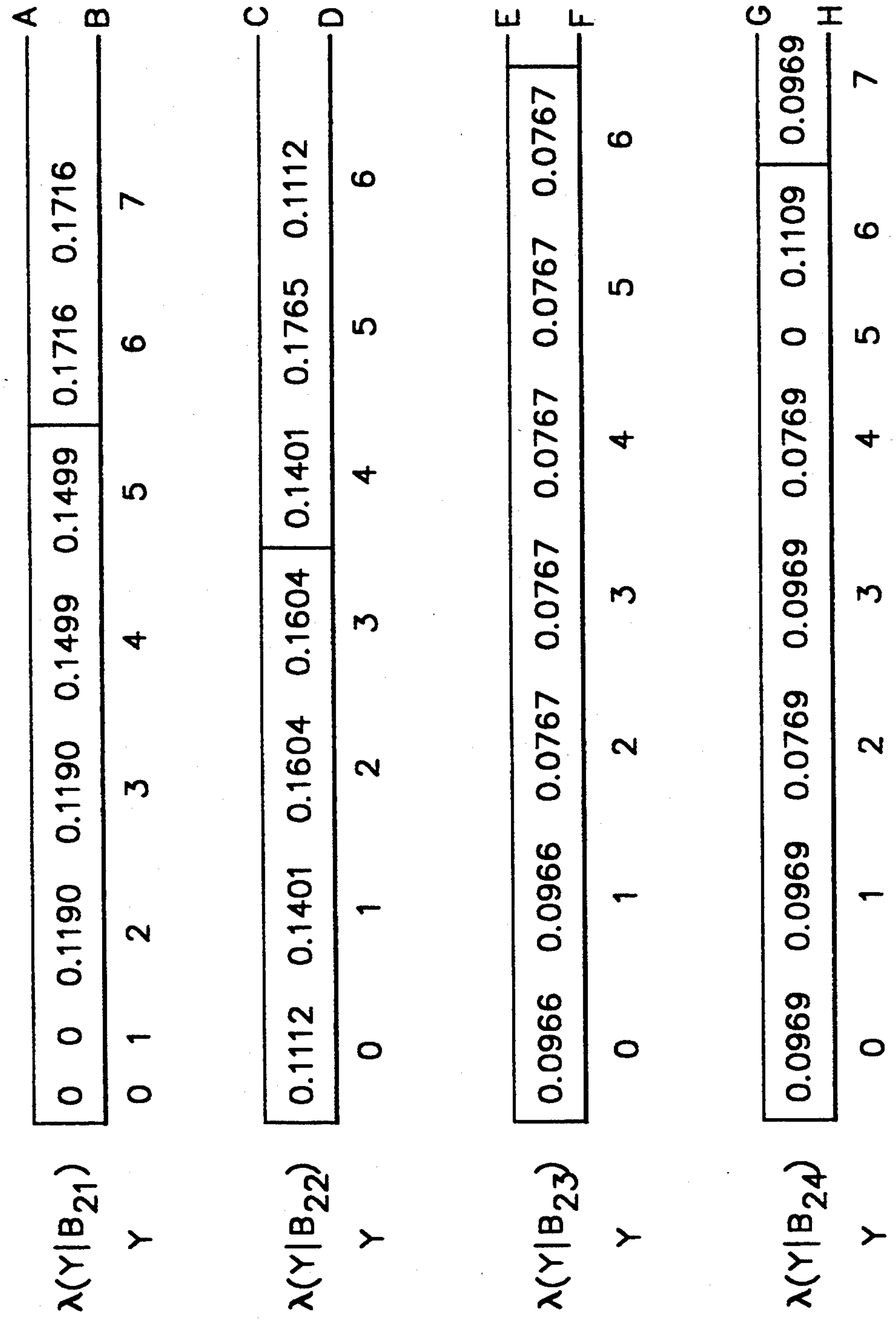
FIG. 20 included FIGS. **20*a*–20*b* diagrammatically illustrates dividing respective columns $B_{2j}$ into $n_{2j}$ equal area intervals along the luminance (Y) axis of the histogram of FIG. 18**.
Figure 20B:
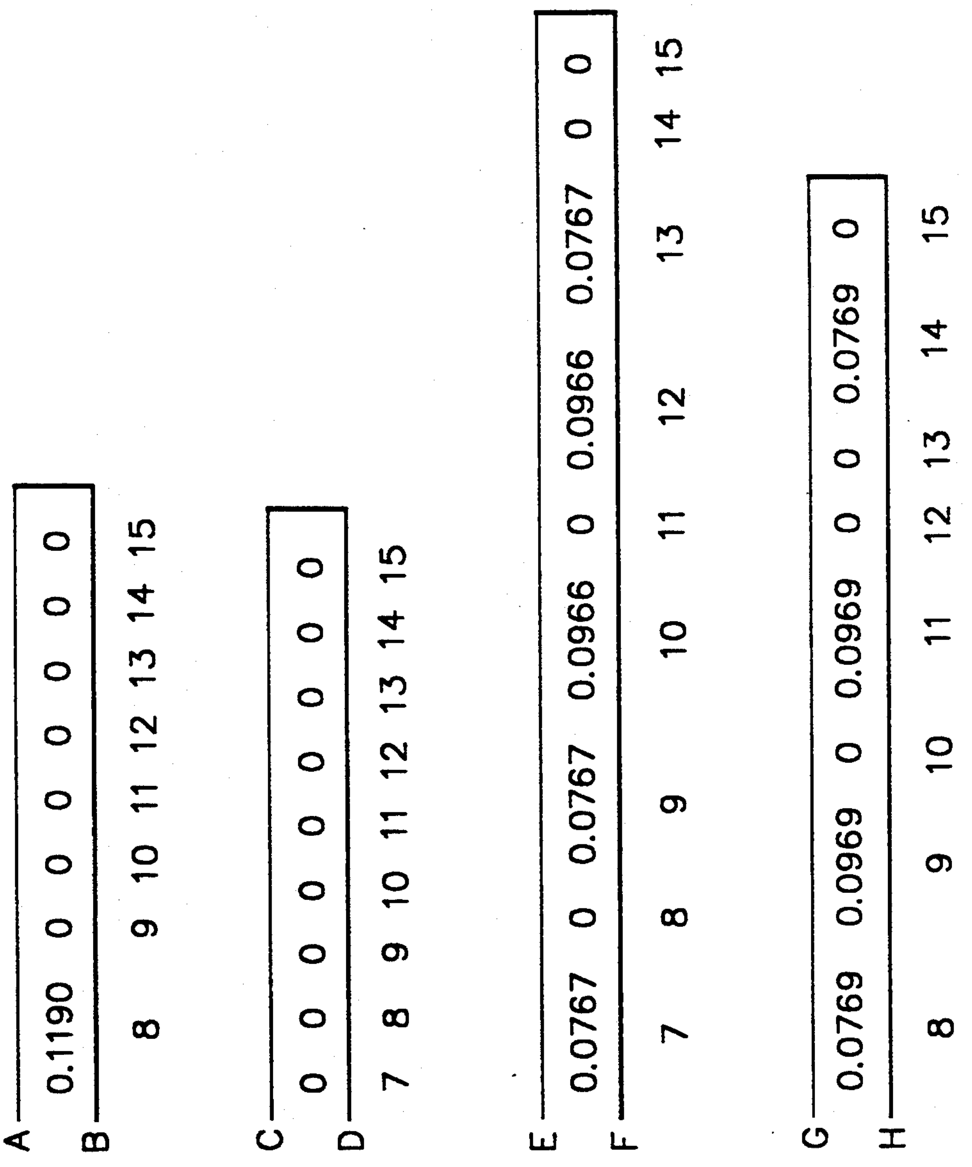

Each column $B_{2j}$ is now divided into $n_{2j}$ equal area intervals along the luminance (Y) axis to produce the partitioning of each block, as diagrammatically illustrated in FIG. 20. Applying the partitioning boundaries of FIG. 20 to the histogram of FIG. 18 results in the two dimensional partitioning of the original histogram, as shown in FIG. 21.

Generate Luminance Look-Up Table (FIG. 22)

The partitioned histogram of FIG. 21 ia next converted into a luminance look-up table illustrated in FIG. 22, with numerical code values 0–7 used to identify with which of respective partitioned luminance-chrominance sub-regions, matrix locations of the histogram are associated. Namely, the look-up table of FIG. 22 has a two-bit chrominance code to identify one of the four chrominance regions $B_{21}$, $B_{22}$, $B_{23}$, $B_{24}$, and a three-bit luminance code to identify one of the eight luminance regions.

Generate Luminance/Chrominance Index Table (FIG. 23)

The actual chrominance and luminance values used to define each color code of the palette are the Cr and Y coordinates of the centroids of the respective luminance-chrominance sub-regions of the partitioned histogram of FIG. 21. These calculated centroid values are tabulated in the palette color index table shown FIG. 23, which lists each palette color in terms of a pair of luminance-chrominance values, circled in FIG. 21.

Generate Output Image Color Code Pixel Map (FIG. 24)

In order to map the palette values tabulated in the map of FIG. 23 into the image array, an output image map shown in FIG. 24 is created. Specifically, FIG. 24 spatially associates each of the pixels of the image array with one of the numerical values (0–7) of the respective luminance-chrominance sub-regions of the histogram, and tabulated in the look-up table of FIG. 22. To create the map of FIG. 24, for a pair of x,y coordinates of a respective pixel of each of the chrominance and luminance image arrays of FIGS. 10 and 11, a chrominance Cr value and a luminance value Y of the original digital color image are obtained. For example, for the x,y coordinate pair (x=5, y=5), the original image (FIGS. 10 and 11) has a chrominance value of Cr=13 and a luminance value of Y=6. From the Cr LUT of FIG. 19, an input Cr value of Cr=13 is quantized to a value of '4'. From the Y LUT of FIG. 22, the quantized Cr value of '4' and the luminance value of '5' produce the luminance-luminance subregion numerical identifier '5'. Thus, the palette code identifier '5' is loaded into the output image matrix coordinate location (x=5, y=5) of FIG. 24.

As pointed out previously, although the foregoing example of the sequential product code vector quantization mechanism of the present invention has been described and illustrated for a two-dimensional Y-Cr color space, it is actually carried out for a three-dimensional color space, taking into account the Cb coordinate of the Y,Cr,Cb coordinate system, so that the respective histograms and associated conversion tables are actually associated with a three-dimensional color space. Thus, the resulting output code map for the complete three-dimensional color space will include a listing of output Cb values, in addition to the Y and Cr values listed for the two-dimensional case of the present example.

Figure 25:
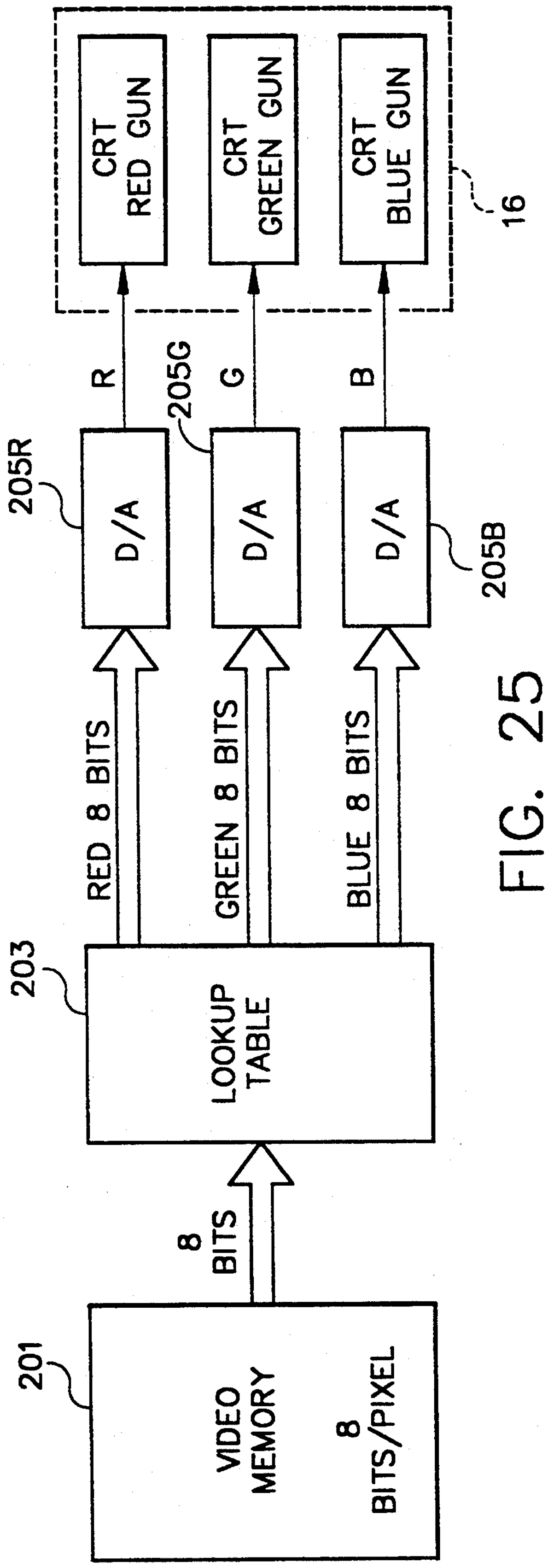
FIG. 25 diagrammatically illustrates the connection of a video memory in which the color codes of the palette are mapped to their respective twenty-four bit color values by way of a look-up table which drives respective D-A converters associated with the RGB ports of an image output device.

After the quantization of the Y,Cr,Cb color space, the luminance (Y) and chrominance (Cr, Cb) codes are reconverted back into respective R, G and B code values. For this purpose, as shown in FIG. 25, a video memory 201, in which palette color labels are stored, may be coupled to a look-up table 203, which generates RGB values associated with the palette color labels. The RGB outputs of look-up table 203 are applied to respective D-A converters 205R, 205G and 205B associated with the RGB ports of the image output device 16.

Figure 26:
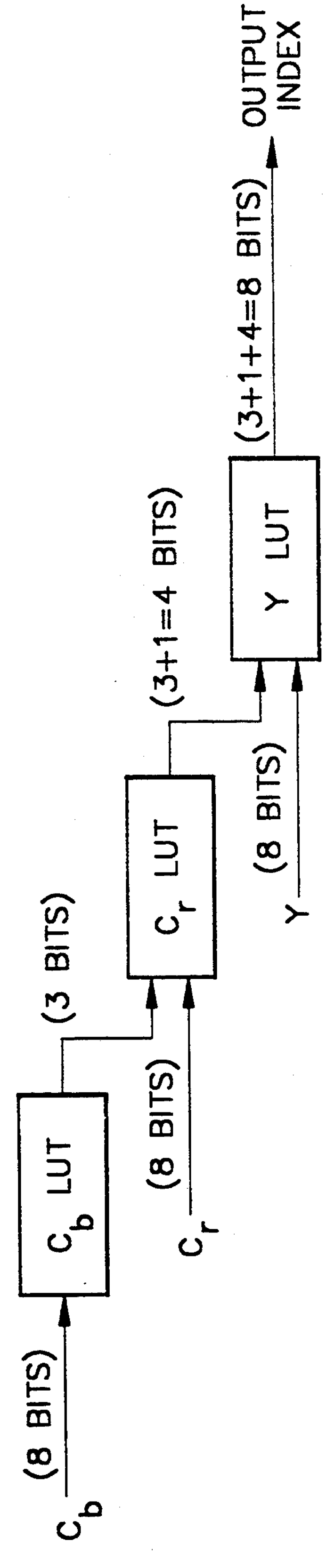
FIG. 26 shows manner in which respective (Cb, Cr and Y) quantization look-up tables may be effectively cascaded with one another.

A significant processing advantage of the present invention is the manner in which respective (Cb, Cr and Y) quantization look-up tables may be effectively cascaded with one another, as shown in FIG. 26, which allows the image data to be read in, pixel by pixel, and thus obviates the need to store the entire image in memory. Moreover, since it is unnecessary to store the entire image in memory in order to perform instantaneous mapping at the output of the process, it is not necessary to use the entire image in order to configure the output color code palette.

Because processing of three dimensional data, particularly the storing of a three dimensional histogram in an associated three dimensional memory array, may require an extremely large amount of memory (e.g. even with the prequantization of the two chrominance components a 256×128×128 (four megabytes) array), alternative processing of the histogram may be preferred. This is particularly true where the histogram contains a large number of 'no data' entries. In accordance with alternative histogram processing, rather than provide memory for the entire three dimensional range of the histogram, the amount of memory employed is made histogram entry-dependent.

Pursuant to a first alternative, histogram entries are generated sequentially in association with quantization processing along each respective coordinate axis. In particular, only marginal and conditional histograms are generated. Thus, for the first chrominance axis to be quantized, only a single one-dimensional marginal histogram (which comprises a summation of all data entries projected upon the respective axis), is generated. In the simplified two-dimensional example described above in which the Cb chrominance axis has not been illustrated, quantization of the first axis processed (the Cr axis) requires only a one-dimensional marginal histogram (FIGS. 13 and 14).

The sequential processing of the next coordinate also employs one dimensional histogram storage. For the second axis processed, however, a plurality of one-dimensional histograms are required. Specifically, the number of conditional histograms required for any coordinate axis will depend upon the number of conditional histograms employed to quantize the previous axis and the number of splits of that axis. Thus, as described previously, in the illustrated two-dimensional example, in addition to the single marginal histogram for the Cr coordinate, of conditional histograms are generated for the luminance coordinate in association with the four quantized regions $B_{21}$, $B_{22}$, $B_{23}$, $B_{24}$, into which the Cr coordinate has been partitioned based upon the processing of its one dimensional histogram.

This sequential one-dimensional histogram processing is attractive, not only because less memory is required, but less computation is needed to generate a one-dimensional histogram than to build a three-dimensional histogram. Moreover, because the one-dimensional approach looks at data only along one axis, the maximum size of a data set is the range of the coordinate, not the product of all three coordinates. Thus, for a digital image encoded to eight bits per color per pixel, the maximum size of the data set is 256 entries, rather than 256×256×256. There is a trade-off with speed however, using the one-dimensional histogram processing approach, particularly in the course of quantizing along the luminance axis, since multiple (three) passes through the image are required. Still, this scheme offers a significant reduction in memory requirements.

Another data entry-dependent method to reduce histogram memory involves the generation of a two-dimensional array to represent the three-dimensional histogram. For this purpose, the three-dimensional color space is stored in terms of two coordinates, e.g. the Y and Cr chrominance coordinates. Each entry of the array is a look-up table of color data covering the range of the Cb values for a respective Y-Cr coordinate location. In effect, this array is a compressed version of the three-dimensional histogram, the degree of compression depending upon the number of color space coordinates having no data entries. An entry value of a third coordinate, such as Cb, may also be stored as a binary tree structure. When accessing the two-dimensional array a corresponding value of a third coordinate data entry is located by conducting a binary search along the third coordinate (Cb axis) of the two-dimensional array.

In the course of designing the palette used in the present invention subsampled images may be used. The image may be subsampled either vertically (along the y axis), horizontally (along the x axis), or both. Moreover, the samples may be non-uniformly spaced. In the case of subsampling the image by a factor m in each spatial direction (x and y), then the number of pixels being processed is reduced by a factor of $m^2$; consequently, processing time can be reduced. The effect of subsampling in the course of sequential splitting will depend upon the extent to which the subsampling of the image reduces the number of distinct colors. Still, a significant reduction in processing time is afforded with only a minimal reduction in image quality.

As will be appreciated from the foregoing description, the sequential product code vector quantization technique of the present invention effectively serves as a digital image data compression mechanism that is capable of successfully quantizing chrominance and luminance features of an image based upon a conditional distribution of these features within partitioned regions of chrominance/luminance color space. The sequential product code scheme provides a set of coordinate conversion look-up tables which, when cascaded together, provide a transform operator for rapidly converting the color value of each pixel of an original image into an output image color code that both closely matches the color of the original image and is spatial activity dependent, so as to prevent the generation of contouring artifacts in the reproduced image.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of convening a first digital color image, having the color composition of each of pixels of said first digital color image encoded into first luminance and chrominance representative codes of a first encoded color resolution, to a second digital color image having the color composition of each of pixels of said second digital color image encoded at a second encoded color resolution different from that of said first digital color image and color codes of which are selected to reproduce a prescribed color image quality comprising the steps of:

(a) generating a color space histogram of said first luminance and chrominance representative codes;

(b) generating an asymptotically optimal quantizer density function of said color space histogram;

(c) sequentially partitioning said asymptotically optimal quantizer density function of said color space histogram along respective chrominance and luminance axes through which said histogram is defined into a plurality of histogram cells;

(d) for each of said histogram cells, deriving a respective set of chrominance and luminance output codes; and (e) defining the color composition of a respective pixel of said second digital color image in accordance with one of the sets of chrominance and luminance output codes derived in step (d).

2. A method according to claim 1, wherein step (e) comprises transforming said sets of chrominance and luminance output codes of said second digital color image into sets of output color codes for application to a color image reproduction device through which a color output image is provided.

3. A method according to claim 1, wherein step (c) comprises sequentially partitioning said asymptotically optimal quantizer density function of said color space histogram along first and second chrominance axes and a luminance axis through which said histogram is defined, and wherein which of said first and second chrominance axes is partitioned first is dependent upon which chrominance axis produces a lower mean squared error in the values of said chrominance output codes.

4. A method according to claim 1, wherein step (c) comprises sequentially partitioning said asymptotically optimal quantizer density function of said color space histogram into a first plurality of histogram regions along a first chrominance axis, a second plurality of histogram regions along a second chrominance axis, and a third plurality of histogram regions along said luminance axis, and wherein the number of histogram regions of said first plurality and the number of histogram regions of said second plurality are dependent upon mean squared errors in the values of said chrominance and luminance output codes.

5. A method according to claim 1, wherein step (c) further comprises further partitioning one or more selected ones of the plurality of histogram cells into which said asymptotically optimal quantizer density function of said color space histogram has been partitioned.

6. A method according to claim 1, wherein the partitioning of said asymptotically optimal quantizer density function of said color space histogram along a respective one of said first and second chrominance axes and said luminance axis in step (c) is such that the area of each partitioned region along a respective axis is the same.

7. A method according to claim 1, wherein step (c) comprises partitioning said asymptotically optimal quantizer density function of said color space histogram along a respective ith one of said first and second chrominance axes and said luminance axis into a plurality $N_i$ of color space regions of equal area.

8. A method according to claim 1, wherein said asymptotically optimal quantizer density function of said color space histogram comprises a Lambda function which specifies the relative spacing of quantization levels along the respective axes of the color space, while minimizing mean squared error along a respective axis partitioned in step (c).

9. A method according to claim 1, wherein said asymptotically optimal quantizer density function of said color space histogram comprises a Lambda function which integrates to a value of 1, such that along a respective ith axis of said Lambda function partition boundaries occur at axial locations which demarcate $N_i$ areal segments under the Lambda function, each areal segment being equal to $1/N_i$.

10. A method according to claim 1, wherein step (c) comprises the steps of:

(c1) quantizing said asymptotically optimal quantizer density function of said color space histogram along a first chrominance axis into a number of N1 levels, so as to effectively partition said color space into N1 color space slices $B_{2j}$, where $j=1 \ldots N1$, (c2) for $j=1 \ldots N1$, quantizing a respective jth slice $B_{2j}$ along the second chrominance axis into $n_{2j}$ levels, so as to further partition the color space into N2 columns $B_{3j}$ that are parallel with a remaining, yet to be quantized luminance coordinate axis Y, and (c3) for $j=1 \ldots N2$, quantizing respective jth columns $B_{3j}$ along the luminance axis Y into $n_{3j}$ levels, so as to partition the color space into N3 rectangular parallelpiped cells.

11. A method according to claim 10, wherein,in the course of executing steps (c1) and (c2), the choice of which of said first and second chrominance axes is partitioned first is dependent upon which order of chrominance axis quantization partitioning yields the smaller total mean squared error in the values of derived output codes.

12. A method according to claim 10, wherein the number of N3 rectangular parallelpiped cells is less than the entirety of said second encoded color resolution, thereby reserving a portion of the capacity of said second encoded color resolution for quantization adjustment, and wherein step (c) further comprises the step (c4) of further partitioning one or more selected ones of the plurality of histogram cells into which said asymptotically optimal quantizer density function of said color space histogram has been partitioned, in dependence upon variations between their associated output color code values and input color values of the original color space distribution.

13. A method according to claim 12, wherein step (c4) comprises further partitioning one or more selected ones of the plurality of histogram cells by locating an additional boundary between regions along a selected axis at a point midway of histogram values in the region being further partitioned.

14. A method according to claim 10, wherein (c3) comprises the steps of:

(c3-1) subdividing said digital image is into blocks of pixels and, at each pixel location (m,n) within each block 1 of the image, deriving a gradient measure of the variation of luminance, (c3-2) deriving an average value $\alpha_L$ of the luminance gradient values of the block 1, and using the derived average value $\alpha_L$, determining a block weighting value $w_L$ that is inversely related to the spatial activity within a respective block 1, (c3-3) for each color $c_i$ within the histogram, assigning a subjective weight $w_{ci}$ as the average of the block weights $w_L$ for each block in which the color $c_i$ appears, and (c3-4) quantizing said respective jth columns $B_{3j}$ along the luminance axis Y into $n_{3j}$ levels, so as to partition the color space into N3 rectangular parallelpiped cells, and wherein the number of levels $n_{3j}$ to be assigned to a respective column is determined in accordance with $w'_j$, which is the average of the subjective weights $w_{ci}$ of all colors $c_i$ in the column $B_{3j}$.

15. A method according to claim 1, wherein step (c) comprises the steps of:

(c1) quantizing said asymptotically optimal quantizer density function of said color space histogram along a first chrominance axis into a preliminary estimated number of N1 levels, so as to effectively partition said color space into N1 color space slices $B_{2j}$, where $j=1 \ldots N1$, (c2) for $j=1 \ldots N1$, quantizing a respective jth slice $B_{2j}$ along the second chrominance axis into $n_{2j}$ levels, so as to further partition the color space into a preliminary estimated number of N2 columns $B_{3j}$ that are parallel with a remaining, yet to be quantized luminance coordinate axis Y, (c3) deriving preliminary mean squared error values for said first and second chrominance axes using differences between derived output color code values therefor and original color values of the digital image, (c4) deriving a preliminary mean square error value for said luminance axis, (c5) deriving a set of empirical constants to be employed in determining total mean squared error, in accordance with the preliminary mean square error values derived in steps (c3) and (c4), (c6) determining optimal values for N1 and N2 in accordance with the values of the empirical constants derived in step (c5) and mean squared error values derived in steps (c3) and (c4), (c7) deriving a first value of total mean squared error for said color space in accordance with the optimal values for N1 and N2 and the of the empirical constants derived in step (c5), (c8) reversing the order of said first and second chrominance axes and repeating steps (c1)–(c7), so as to derive a second value of total mean squared error for said color space, and (c9) using the chrominance axis order which yields the lower of said first and second total mean squared errors and said optimal values for N1 and N2, (c9-1) quantizing said asymptotically optimal quantizer density function of said color space histogram along the chosen first chrominance axis into said optimal number of N1 levels, so as to effectively partition said color space into N1 color space slices $B_{2j}$, where $j=1 \ldots N1$, (c9-2) for $j=1 \ldots N1$, quantizing a respective jth slice $B_{2j}$ along the chosen second chrominance axis into $n_{2j}$ levels, so as to further partition the color space into said optimal number of N2 columns $B_{3j}$ that are parallel with a remaining, yet to be quantized luminance coordinate axis Y, and (c9-3) for $j=1 \ldots N2$, quantizing respective jth columns $B_{3j}$ along the luminance axis Y into $n_{3j}$ levels, so as to partition the color space into N3 rectangular parallelpiped cells.

16. A method according to claim 15, wherein step (d) comprises for each of the histogram cells obtained by step (c9-3), deriving a respective set of chrominance and luminance output codes in accordance with chrominance and luminance coordinates of the centroids of the respective quantization cells of the partitioned color space.

17. A method according to claim 15, wherein step (c4) comprises weighting the preliminary mean square error value for said luminance axis in accordance with a factor K which emphasizes the luminance value of mean square error relative to mean squared error along the chrominance axes of the color space, so as to reduces luminance contouring artifacts.

18. A method according to claim 1, further comprising the step of (f), for a respective pixel of said second digital color image, combining output code values of said second digital color image with input code values to produce a quantization error vector and then filtering said quantization error vector through an error diffusion filter and summing the filtered vector with a respective pixel vector value of said first digital color image.

19. A method according to claim 18, wherein said error diffusion filter employs a filter function based upon a human visual model.

20. A method of quantizing the color composition of a digital color image comprising the steps of:

(a) generating a histogram of the color composition of the pixels of said digital color image in terms of prescribed color coordinates through which the color composition of said digital image is definable;

(b) performing sequential product code quantization of said histogram along respective coordinate axes thereof in accordance with an asymptotically optimal quantizer density function of said color space histogram, so as to subdivide said histogram into a plurality of color space regions;

(c) for each of the color space regions into which said histogram has been subdivided in step (b), deriving a respective output code representative of the color space contents of that region.

21. A method according to claim 20, wherein step (c) comprises, for each of the coordinates of said histogram, generating a respective look-up table that associates the digitized color composition for that respective coordinate of said digital color image with a quantized color space region.

22. A method according to claim 20, wherein step (b) comprises partitioning said asymptotically optimal quantizer density function of said color space histogram along a first chrominance axis, associated with a first chrominance component of said first digital color image, into first histogram regions, partitioning said first histogram regions along a second chrominance axis, associated with a second chrominance component of said first digital color image, into second histogram regions, and partitioning said second histogram regions along a luminance axis, associated with the luminance component of said digital color image, into third histogram regions.

23. A method according to claim 22, wherein step (c) comprises, for each of said third histogram regions, deriving a respective set of chrominance and luminance output codes, and defining the color composition of a respective pixel of an output digital color image in accordance with one of the sets of chrominance and luminance output codes.

24. A method according to claim 23, wherein step (c) further comprises transforming said sets of chrominance and luminance output codes of said second digital color image into sets of output color codes for application to a color image reproduction device through which a color output image is provided.

25. A method according to claim 22, wherein the partitioning of said asymptotically optimal quantizer density function of said color space histogram along a respective one of said first and second chrominance axes and said luminance axis is such that the area of each partitioned region along a respective axis is the same.

26. A method according to claim 22, wherein step (b) comprises sequentially partitioning said asymptotically optimal quantizer density function of said color space histogram along first and second chrominance axes and a luminance axis through which said histogram is defined, and wherein which of said first and second chrominance axes is partitioned first is dependent upon which chrominance axis produces a lower mean squared error in the values of said chrominance output codes.

27. A method according to claim 22, wherein step (b) comprises sequentially partitioning said asymptotically optimal quantizer density function of said color space histogram into a first plurality of histogram regions along a first chrominance axis, a second plurality of histogram regions along a second chrominance axis, and a third plurality of histogram regions along said luminance axis, and wherein the number of histogram regions of said first plurality and the number of histogram regions of said second plurality are dependent upon mean squared errors in the values of said chrominance and luminance output codes.

28. A method according to claim 22, wherein step (b) further comprises further partitioning one or more selected ones of the plurality of histogram cells into which said asymptotically optimal quantizer density function of said color space histogram has been partitioned.

29. A method according to claim 22, wherein said asymptotically optimal quantizer density function of said color space histogram comprises a Lambda function which integrates to a value of 1, such that along a respective ith axis of said Lambda function partition boundaries occur at axial locations which demarcate $N_i$ areal segments under the Lambda function, each areal segment being equal to $1/N_i$.

30. A method according to claim 22, wherein said asymptotically optimal quantizer density function of said color space histogram comprises a Lambda function which specifies the relative spacing of quantization levels along the respective axes of the color space, while minimizing mean squared error along a respective axis partitioned in step (b).

31. A method according to claim 22, wherein step (b) comprises the steps of:

(b1) quantizing said asymptotically optimal quantizer density function of said color space histogram along a first chrominance axis into a number of N1 levels, so as to effectively partition said color space into N1 color space slices $B_{2j}$, where $j=1 \ldots N1$, (b2) for $j=1 \ldots N1$, quantizing a respective jth slice $B_{2j}$ along the second chrominance axis into $n_{2j}$ levels, so as to further partition the color space into N2 columns $B_{3j}$ that are parallel with a remaining, yet to be quantized luminance coordinate axis Y, and (b3) for $j=1 \ldots N2$, quantizing respective jth columns $B_{3j}$ along the luminance axis Y into $n_{3j}$ levels, so as to partition the color space into N3 rectangular parallelpiped cells.

32. A method according to claim 31, wherein,in the course of executing steps (c1) and (c2), the choice of which of said first and second chrominance axes is partitioned first is dependent upon which order of chrominance axis quantization partitioning yields the smaller total mean squared error in the values of derived output codes.

33. A method according to claim 31, wherein the number of N3 rectangular parallelpiped cells is less than the entirety of said second encoded color resolution, thereby reserving a portion of the capacity of said second encoded color resolution for quantization adjustment, and wherein step (b) further comprises the step (b4) of further partitioning one or more selected ones of the plurality of histogram cells into which said asymptotically optimal quantizer density function of said color space histogram has been partitioned, in dependence upon variations between their associated output color code values and input color values of the original color space distribution.

34. A method according to claim 33, wherein step (b4) comprises further partitioning one or more selected ones of the plurality of histogram cells by locating an additional boundary between regions along a selected axis at a point midway of histogram values in the region being further partitioned.

35. A method according to claim 31, wherein (b3) comprises the steps of:

(b3-1) subdividing said digital image is into blocks of pixels and, at each pixel location (m,n) within each block 1 of the image, deriving a gradient measure of the variation of luminance, (b3-2) deriving an average value $\alpha_L$ of the luminance gradient values of the block 1, and using the derived average value $\alpha_L$, determining a block weighting value $w_L$ that is inversely related to the spatial activity within a respective block 1, (b3-3) for each color $c_i$ within the histogram, assigning a subjective weight $w_{ci}$ as the average of the block weights $w_L$ for each block in which the color $c_i$ appears, and (b3-4) quantizing said respective jth columns $B_{3j}$ along the luminance axis Y into $n_{3j}$ levels, so as to partition the color space into N3 rectangular parallelpiped cells, and wherein the number of levels $n_{3j}$ to be assigned to a respective column is determined in accordance with $w'_j$, which is the average of the subjective weights $w_{ci}$ of all colors $c_i$ in the column $B_{3j}$.

36. A method according to claim 22, wherein step (b) comprises the steps of:

(b1) quantizing said asymptotically optimal quantizer density function of said color space histogram along a first chrominance axis into a preliminary estimated number of N1 levels, so as to effectively partition said color space into N1 color space slices $B_{2j}$, where j=1 . . . N1, (b2) for j=1 . . . N1, quantizing a respective jth slice $B_{2j}$ along the second chrominance axis into $n_{2j}$ levels, so as to further partition the color space into a preliminary estimated number of N2 columns $B_{3j}$ that are parallel with a remaining, yet to be quantized luminance coordinate axis Y, (b3) deriving preliminary mean squared error values for said first and second chrominance axes using differences between derived output color code values therefor and original color values of the digital image, (b4) deriving a preliminary mean square error value for said luminance axis, (b5) deriving a set of empirical constants to be employed in determining total mean squared error, in accordance with the preliminary mean square error values derived in steps (b3) and (b4), (b6) determining optimal values for N1 and N2 in accordance with the values of the empirical constants derived in step (b5) and mean squared error values derived in steps (b3) and (b4), (b7) deriving a first value of total mean squared error for said color space in accordance with the optimal values for N1 and N2 and the of the empirical constants derived in step (b5), (b8) reversing the order of said first and second chrominance axes and repeating steps (b1)-(b7), so as to derive a second value of total mean squared error for said color space, and (b9) using the chrominance axis order which yields the lower of said first and second total mean squared errors and said optimal values for N1 and N2, (b9-1) quantizing said asymptotically optimal quantizer density function of said color space histogram along the chosen first chrominance axis into said optimal number of N1 levels, so as to effectively partition said color space into N1 color space slices $B_{2j}$, where j=1 . . . N1, (b9-2) for j=1 . . . N1, quantizing a respective jth slice $B_{2j}$ along the chosen second chrominance axis into $n_{2j}$ levels, so as to further partition the color space into said optimal number of N2 columns $B_{3j}$ that are parallel with a remaining, yet to be quantized luminance coordinate axis Y, and (b9-3) for j=1 . . . N2, quantizing respective jth columns $B_{3j}$ along the luminance axis Y into $n_{3j}$ levels, so as to partition the color space into N3 rectangular parallelpiped cells.

37. A method according to claim 36, wherein step (c) comprises for each of the histogram cells obtained by step (b9-3), deriving a respective set of chrominance and luminance output codes in accordance with chrominance and luminance coordinates of the centroids of the respective quantization cells of the partitioned color space.

38. A method according to claim 36, wherein step (b4) comprises weighting the preliminary mean square error value for said luminance axis in accordance with a factor K which emphasizes the luminance value of mean square error relative to mean squared error along the chrominance axes of the color space, so as to reduces luminance contouring artifacts.

39. A method according to claim 22, further comprising the step of (d) for a respective pixel of said color image, combining output code values with input code values to produce a quantization error vector and then filtering said quantization error vector through an error diffusion filter and summing the filtered vector with a respective pixel vector value of said first digital color image.

40. A method according to claim 39, wherein said error diffusion filter employs a filter function based upon a human visual model.

41. A method according to claim 20, wherein step (a) comprises generating said histogram in the form of one-dimensional histograms of the color space activity of said digital color image, the composition of each one-dimensional histogram being referenced to a respective one of the color coordinates through which the color composition of said digital image is definable.

42. A method according to claim 41, wherein step (b) comprises performing sequential product code partitioning of said one-dimensional histograms along their respectively associated coordinate axes in accordance with said asymptotically optimal quantizer density function of said color space histogram, so as to subdivide said histogram into said plurality of color space regions.

43. An apparatus for quantizing a data vector structure having a multi-dimensional coordinate system, comprising a plurality of sequentially coupled look-up tables, such that an output of an ith look-up table is a pointer to an entry in an (i+1)th look-up table, the respective look-up tables of said plurality being associated with the respective axes of said multi-dimensional coordinate system of said data vector structure, and wherein the output of the last look-up table in sequence is a multi-bit code representative of a quantized data structure value, and wherein said vector structure is representative of a digital color image color space, and wherein each look-up table is coupled to receive, as part of an entry pointer therefor, a code representative of a prescribed quantization of a coordinate of said digital color image color space, and wherein said prescribed quantization of a coordinate of said digital color image color space corresponds to a sequential product code partitioning of said histogram along respective coordinate axes thereof in accordance with an asymptotically optimal quantizer density function of said color space histogram, so as to subdivide said histogram into a plurality of color space regions.

44. An apparatus according to claim 43, wherein an ith one of said look-up tables is associated with a chrominance coordinate of said digital color image color space and wherein an (i+j)th one of said look-up tables is associated with a luminance coordinate of said digital color image color space, and wherein the output of the last look-up table in sequence is a multi-bit code representative of a color of said digital image color space.

45. A method of quantizing a multi-dimensional digital image color space comprising the steps of:

(a) providing a plurality of look-up tables, a respective look-up table of said plurality being associated with a respective axis of said multi-dimensional digital image color space; and (b) sequentially coupling said look-up tables together such that an output of an ith look-up table is a pointer to an entry in an (i+1)th look-up table, whereby output of the last look-up table in sequence is a multi-bit code representative of a quantized data structure value, and wherein each look-up table is coupled to receive, as part of an entry pointer therefor, a code representative of a prescribed quantization of a coordinate of said multi-dimensional digital image color space, said prescribed quantization corresponding to a sequential product code partitioning of said multi-dimensional digital image color space, along a respective coordinate axis into a plurality of digital color space regions, and wherein said prescribed quantization of a coordinate of said digital color image color space corresponds to a sequential product code partitioning of said digital color image space along its respective coordinate axes thereof in accordance with an asymptotically optimal quantizer density function of said digital image color space, so as to subdivide said digital image color space into a plurality of color space regions.

46. For use with a digital color image comprised of an array of pixels the color compositions of which are digitized to a prescribed color code resolution, a method of quantizing a multi-dimensional color space structure through which the color compositions of the pixels of said array are definable, comprising the steps of:

(a) providing a multi-dimensional data structure representative of the multi-dimensional color space of said digital color image; and (b) performing sequential product code partitioning of said multi-dimensional data structure along its respective coordinate axes thereof into a plurality of color cells in accordance with an asymptotically optimal quantizer density function of said multi-dimensional digital image color space, so as to subdivide said multi-dimensional digital image color space into a plurality of color space regions.

47. A method according to claim 46, wherein step (a) comprises providing a luminance, chrominance data structure associated with a luminance, chrominance color space representative of said digital color image, and wherein step (b) comprises performing sequential product code partitioning of said luminance, chrominance data structure along each of respective chrominance and luminance coordinate axes thereof into a plurality of luminance-chrominance cells, each of which is associated with a quantized value of said digital color image.

48. A method according to claim 47, further comprising the step of (c), for each of the coordinates of said multi-dimensional digital color space, generating a respective look-up table that associates the digitized color composition for that respective coordinate of said digital color image with an associated quantized coordinate value.

49. A method according to claim 48, wherein step (c) comprises sequentially coupling the look-up tables together, and generating therefrom, in response to the color composition of a pixel of said digitized color image, a respective color code which is representative of the color composition of said digital color image.

50. An apparatus for converting a first digital color image, having the color composition of each of pixels of said first digital color image encoded into first luminance and chrominance representative codes of a first encoded color resolution, to a second digital color image having the color composition of each of pixels of said second digital color image encoded at a second encoded color resolution different from that of said first digital color image and color codes of which are selected to reproduce a prescribed color image quality comprising the steps of:

a digital image processor which is operative to generate a color space histogram of said first luminance and chrominance representative codes and to sequentially partitioning an asymptotically optimal quantizer density function of said color space histogram along respective chrominance and luminance axes through which said histogram is defined into a plurality of histogram cells, each of said histogram cells having a respective set of chrominance and luminance output codes; and an image output unit which is operative to produce a second digital color image, the color composition of respective pixels of which are defined in accordance with the sets of chrominance and luminance output codes derived by said digital image processor.

51. An apparatus according to claim 50, wherein said digital image processor is operative to transform sets of chrominance and luminance output codes of said second digital color image into sets of output color codes for application to a color image reproduction device of said image output unit through which a color output image is reproduced.

52. An apparatus according to claim 50, wherein said digital image processor is operative to sequentially partition said asymptotically optimal quantizer density function of said color space histogram along first and second chrominance axes and a luminance axis through which said histogram is defined, and wherein which of said first and second chrominance axes is partitioned first is dependent upon which chrominance axis produces a lower mean squared error in the values of said chrominance output codes.

53. An apparatus according to claim 50, wherein said digital image processor is operative to sequentially partition said asymptotically optimal quantizer density function of said color space histogram into a first plurality of histogram regions along a first chrominance axis, a second plurality of histogram regions along a second chrominance axis, and a third plurality of histogram regions along said luminance axis, and wherein the number of histogram regions of said first plurality and the number of histogram regions of said second plurality are dependent upon mean squared errors in the values of said chrominance and luminance output codes.

54. An apparatus according to claim 50, wherein said digital image processor is operative to further selectively partition at least one the plurality of histogram cells into which said asymptotically optimal quantizer density function of said color space histogram has been partitioned.

55. An apparatus according to claim 50, wherein said digital image processor is operative to partition said asymptotically optimal quantizer density function of said color space histogram along a respective one of said first and second chrominance axes and said luminance axis such that the area of each partitioned region along a respective axis is the same.

56. An apparatus according to claim 50, wherein said asymptotically optimal quantizer density function of said color space histogram comprises a Lambda function which specifies the relative spacing of quantization levels along the respective axes of the color space, while minimizing mean squared error along a respective partitioned axis.

57. An apparatus according to claim 50, wherein said asymptotically optimal quantizer density function of said color space histogram comprises a Lambda function which integrates to a value of 1, such that along a respective ith axis of said Lambda function partition boundaries occur at axial locations which demarcate $N_i$ areal segments under the Lambda function, each areal segment being equal to $1/N_i$.

58. An apparatus according to claim 50, wherein said digital image processor is operative to quantize said asymptotically optimal quantizer density function of said color space histogram along a first chrominance axis into a number of N1 levels, so as to effectively partition said color space into N1 color space slices $B_{2j}$, where $j=1 \ldots N1$, then, for $j=1 \ldots N1$, to quantize a respective jth slice $B_{2j}$ along the second chrominance axis into $n_{2j}$ levels, so as to further partition the color space into N2 columns $B_{3j}$ that are parallel with a remaining, yet to be quantized luminance coordinate axis Y, and for $j=1 \ldots N2$, to quantize respective jth columns $B_{3j}$ along the luminance axis Y into $n_{3j}$ levels, so as to partition the color space into N3 rectangular parallelpiped cells.

59. An apparatus according to claim 58, wherein said digital image processor is operative to first partition that one of said first and second chrominance axes in dependence upon which order of chrominance axis quantization partitioning yields the smaller total mean squared error in the values of derived output codes.

60. An apparatus according to claim 58, wherein said digital image processor is operative to perform the steps of:

(a) quantizing said asymptotically optimal quantizer density function of said color space histogram along a first chrominance axis into a preliminary estimated number of N1 levels, so as to effectively partition said color space into N1 color space slices $B_{2j}$, where $j=1 \ldots N1$, (b) for $j=1 \ldots N1$, quantizing a respective jth slice $B_{2j}$ along the second chrominance axis into $n_{2j}$ levels, so as to further partition the color space into a preliminary estimated number of N2 columns $B_{3j}$ that are parallel with a remaining, yet to be quantized luminance coordinate axis Y, (c) deriving preliminary mean squared error values for said first and second chrominance axes using differences between derived output color code values therefor and original color values of the digital image, (d) deriving a preliminary mean square error value for said luminance axis, (e) deriving a set of empirical constants to be employed in determining total mean squared error, in accordance with the preliminary mean square error values derived in steps (c) and (d), (f) determining optimal values for N1 and N2 in accordance with the values of the empirical constants derived in step (e) and mean squared error values derived in steps (c) and (d), (g) deriving a first value of total mean squared error for said color space in accordance with the optimal values for N1 and N2 and the of the empirical constants derived in step (e), (h) reversing the order of said first and second chrominance axes and repeating steps (a)–(g), so as to derive a second value of total mean squared error for said color space, and (i) using the chrominance axis order which yields the lower of said first and second total mean squared errors and said optimal values for N1 and N2, (i1) quantizing said asymptotically optimal quantizer density function of said color space histogram along the chosen first chrominance axis into said optimal number of N1 levels, so as to effectively partition said color space into N1 color space slices $B_{2j}$, where $j=1 \ldots N1$, (i2) for $j=1 \ldots N1$, quantizing a respective jth slice $B_{2j}$ along the chosen second chrominance axis into $n_{2j}$ levels, so as to further partition the color space into said optimal number of N2 columns $B_{3j}$ that are parallel with a remaining, yet to be quantized luminance coordinate axis Y, and (i3) for $j=1 \ldots N2$, quantizing respective jth columns $B_{3j}$ along the luminance axis Y into $n_{3j}$ levels, so as to partition the color space into N3 rectangular parallelpiped cells.

61. An apparatus according to claim 60, wherein said digital image processor is operative to subdivide said digital image into blocks of pixels and, at each pixel location (m,n) within each block 1 of the image, derive a gradient measure of the variation of luminance, to derive an average value $\alpha_L$ of the luminance gradient values of the block 1, and using the derived average value $\alpha_L$, determine a block weighting value $w_L$ that is inversely related to the spatial activity within a respective block 1, and, for each color $c_i$ within the histogram, assign a subjective weight $w_{ci}$ as the average of the block weights $w_L$ for each block in which the color $c_i$ appears, and quantize said respective jth columns $B_{3j}$ along the luminance axis Y into $n_{3j}$ levels, so as to partition the color space into N3 rectangular parallelpiped cells, and wherein the number of levels $n_{3j}$ to be assigned to a respective column is determined in accordance with $w'_j$, which is the average of the subjective weights $w_{ci}$ of all colors $c_i$ in the column $B_{3j}$.

62. An apparatus according to claim 58, wherein the number of N3 rectangular parallelpiped cells is less than the entirety of said second encoded color resolution, thereby reserving a portion of the capacity of said second encoded color resolution for quantization adjustment, and wherein said digital image processor is further operative to further partition one or more selected ones of the plurality of histogram cells into which said asymptotically optimal quantizer density function of said color space histogram has been partitioned, in dependence upon variations between their associated output color code values and input color values of the original color space distribution.

63. An apparatus according to claim 58, wherein said digital image processor is operative to weight the preliminary mean square error value for said luminance axis in accordance with a factor K which emphasizes the luminance value of mean square error relative to mean squared error along the chrominance axes of the color space, so as to reduces luminance contouring artifacts.

64. An apparatus according to claim 50, wherein said digital image processor is operative to, for a respective pixel of said second digital color image, combine output code values of said respective pixel with input code values to produce a quantization error vector and then filter said quantization error vector through an error diffusion filter and sum the filtered vector with a respective pixel vector value of said first digital color image.

65. An apparatus according to claim 64, wherein said error diffusion filter employs a filter function based upon a human visual model.

66. A method of converting a first digital color image, having the color composition of each of pixels of said first digital color image encoded into L,a,b color space representative codes of a first encoded color resolution, to a second digital color image having the color composition of each of pixels of said second digital color image encoded at a second encoded color resolution different from that of said first digital color image, and color codes of which are selected to reproduce a prescribed color image quality comprising the steps of:

(a) generating a color space histogram of said L,a,b color space representative codes;

(b) generating an asymptotically optimal quantizer density function of said color space histogram;

(c) sequentially partitioning said asymptotically optimal quantizer density function of said color space histogram along respective L, a, and b axes through which said histogram is defined into a plurality of histogram cells;

(d) for each of said histogram cells, deriving a respective set of L,a,b output codes; and (e) defining the color composition of a respective pixel of said second digital color image in accordance with one of the sets of L,a,b output codes derived in step (d).

67. A method according to claim 66, further including the step of:

(f) for a respective pixel of said second digital color image, combining output code values of said respective pixel with input code values to produce a quantization error vector and then filtering said quantization error vector through an error diffusion filter and summing the filtered vector with a respective pixel vector value of said first digital color image.

68. A method according to claim 67, wherein step (f) is carried out in a $Y_yC_xC_z$ coordinate color space.

69. A method according to claim 68, wherein $Y_yC_xC_z$ coordinates are related to said L,a,b coordinate color space by the expressions:

$$L=116f(Y/Y_n)-16,$$

$$a=500[f(X/X_n)-f(Y/Y_n)], \text{ and}$$

$$b=200[f(Y/Y_n)-f(Z/Z_n)],$$

where $f(x)=x^{\frac{1}{3}}$ *if* $0.008856<x$, and x is less than or equal to 1; and $f(x)=7.787\times=(16/116)$, if x is greater than or equal to 0 and x is less than or equal to 0.008856.

70. A method according to claim 66, wherein step (c) comprises sequentially partitioning said asymptotically optimal quantizer density function of said color space histogram along said L, a, and b axes such that the order of quantization is always fixed with the color space being quantized along the L-axis first, a-axis second, and b-axis third.

71. A method according to claim 66, wherein step (c) comprising selecting quantization levels along a respective one of said L, a, and b axes of said L,a,b color such that first and last quantization levels span minimum and maximum possible colors of the color space distribution.

72. A method of converting a first digital color image, having the color composition of each of pixels of said first digital color image encoded into rectangular X,Y,Z color space representative codes of a first encoded color resolution, to a second digital color image having the color composition of each of pixels of said first digital color image encoded at a second encoded color resolution different from that of said first digital color image, and color codes of which are selected to reproduce a prescribed color image quality comprising the steps of:

(a) generating a color space histogram of (L,a,b)-opponent $Y_yC_xC_z$ color space representative codes;

(b) generating an asymptotically optimal quantizer density function of said color space histogram;

(c) sequentially partitioning said asymptotically optimal quantizer density function of said color space histogram along respective $Y_yC_xC_z$ axes through which said histogram is defined into a plurality of histogram cells;

(d) for each of said histogram cells, deriving a respective set of $Y_yC_xC_z$ output codes;

(e) defining the color composition of a respective pixel of said second digital color image in accordance with one of the sets of $Y_yC_xC_z$ output codes derived in step (d); and (f) for a respective pixel of said second digital color image, combining output code values of said respective pixel with input code values to produce a quantization error vector and then filtering said quantization error vector through an error diffusion filter and summing the filtered vector with a respective pixel vector value of said first digital color image.

* * * * *